United States Patent [19]
Bowen

[11] Patent Number: 5,644,338
[45] Date of Patent: *Jul. 1, 1997

[54] ERGONOMIC LAPTOP COMPUTER AND ERGONOMIC KEYBOARD

[76] Inventor: James H. Bowen, 13442 Crimson La., Linden, Va. 22642

[*] Notice: The term of this patent shall not extend beyond the expiration date of Pat. No. 5,502,460.

[21] Appl. No.: 621,439

[22] Filed: Mar. 25, 1996

Related U.S. Application Data

[63] Continuation-in-part of Ser. No. 284,108, Aug. 2, 1994, Pat. No. 5,502,460, which is a continuation-in-part of Ser. No. 67,015, May 26, 1993, abandoned.

[51] Int. Cl.⁶ .................................................. G09G 5/00
[52] U.S. Cl. ........................ 345/168; 400/489; 400/718
[58] Field of Search ............................. 345/168, 169; 341/21, 25; 400/82, 472, 485, 486, 488, 489, 682, 715, 716, 717, 718

[56] References Cited

U.S. PATENT DOCUMENTS

| | | | |
|---|---|---|---|
| 3,940,758 | 2/1976 | Margolin | 340/337 |
| 4,378,553 | 3/1983 | McCall | 340/365 |
| 4,509,873 | 4/1985 | Ryan | 400/489 |
| 4,546,947 | 10/1985 | Gesten | 248/442.2 |
| 4,597,681 | 7/1986 | Hodges | 400/488 |
| 4,661,005 | 4/1987 | Lahr | 400/489 |
| 4,739,451 | 4/1988 | Kuba | 361/394 |
| 5,067,834 | 11/1991 | Szmanda et al. | 400/489 |
| 5,073,050 | 12/1991 | Andrews | 400/82 |
| 5,119,078 | 6/1992 | Grant | 340/711 |
| 5,137,384 | 8/1992 | Spencer et al. | 400/489 |
| 5,141,348 | 8/1992 | Roylance et al. | 400/472 |
| 5,187,644 | 2/1993 | Crisan | 361/393 |
| 5,228,791 | 7/1993 | Fort | 400/489 |
| 5,230,074 | 7/1993 | Canova, Jr. et al. | 395/750 |
| 5,502,460 | 3/1996 | Bowen | 345/168 |

FOREIGN PATENT DOCUMENTS

| | | | |
|---|---|---|---|
| 4108096 | 9/1992 | Germany | 400/472 |
| 9215083 | 9/1992 | WIPO | 340/711 |
| 9218996 | 10/1992 | WIPO | 341/22 |
| 8300308 | 2/1993 | WIPO | 340/365 R |

*Primary Examiner*—Regina D. Liang
*Attorney, Agent, or Firm*—Whitham, Curtis, Whitham & McGinn, P.C.

[57] ABSTRACT

A keyboard to be used on an operators lap that separates to relieve stress in an operators neck and wrists. The keyboard has a flat surface between the keyboard sides, so while being held on a persons lap, will hold reference material and a second party pointing device that can be used with either hand to keep the neck straight. A notebook computer with keyboards that open up on each side so the operators hands are separated. The keyboards can slide closed or fold closed, and when folded, interleave so full size keys can be used and facilitate a more compact design, and can be unfolded so the keyboards slant down below the computer or keyboard to centralize the computer on a persons lap, and reduce the twist between the hand and wrist. The keyboard includes a device to turn all visual indication of computer operation off to be used in a secure no light area with a speaker to give verbal enunciated messages in response to the keyboard and from a computer. The keyboard also has the ability to transmit and receive RF signals to be wireless.

18 Claims, 16 Drawing Sheets

ERGONOMIC LAPTOP COMPUTER AND ERGONOMIC KEYBOARD

CROSS REFERENCE TO RELATED APPLICATION

This application is a continuation-in-part (CIP) application of the patent application having U.S. Ser. No. 08/284,108 filed on Aug. 2, 1994, which will issue as U.S. Pat. 5,502,460 on Mar. 26, 1996, which itself is a CIP application of U.S. Ser. No. 08/067,015 filed May 26, 1993, now abandoned. The complete contents of each of the above-identified patent applications being herein incorporated by reference.

DESCRIPTION

BACKGROUND OF THE INVENTION

1. Field of the Invention

The present invention generally relates to keyboards and computers to relieve an operators cumulative trauma disorders (CTD) and related musculoskeletal conditions, and to provide an integral activity area in the middle of the keyboard for at least reference material, hand writing, track ball and mouse type input pointing devices while holding the keyboard on a persons lap or other surface that is not necessarily normal to the host.

2. Description of the Prior Art

The majority of keyboards disclosed or on the market today are of a rectangular shape with a plurality of horizontal rows of keys, whether it be a Qwerty, Dvorak or other custom keyboards.

There are stands that are being marketed today to hold reference material that are positioned to either side of the keyboard. Also there are mouse pads and track balls on the market that are also positioned to either side of the keyboard. There are also computers that emit a tone or a click to give audible feedback to the operator that a key has been depressed.

There are laptop computers on the market with a standard type of keyboard heretofore mentioned. Some have a track ball in the center of the computer in front of the keyboard that the operator must reach across to input data with the keyboard.

Keyboard entry is now being studied to relieve CTDs relating to the angle of the hand when typing. If the hand, wrist and forearm were straight as the input person operated the keyboard then the stress would not be in the wrist caused by the approach angle of the hand to the keyboard.

Some new keyboard designs have focused on steps toward relieving CTDs by angling the input device from the top center about five degrees to lessen the angle of the wrist when imputing data.

One such device has been disclosed in U.S. Pat. No. 5,119,078, Grant. It has been described as being a "shallow v-shaped and a center-peak that permits the user to function with a relatively straight hand-wrist angle".

A second device that is being marketed by Apple Computer is their "Adjustable Keyboard". This keyboard is very similar to the Grant keyboard with the exception that the keyboard is split in the middle and the angle of the keys are adjustable from zero degrees to about five degrees. The adjustment is made from a pivot in the top center of the keyboard keeping both sides of the keyboard mechanically attached.

Another such device is disclosed in U.S. Pat. No. 4,661,005, Lahr. This keyboard device is rigidly held to a desk top and is adjustable in width from a split in the middle. When in the open position a separate copy holder can be mounted to the desk top. The halves of the keyboard can be mounted to the sides of the computer and then be removed to be stored in another section of the computer for transporting.

Disclosed in a U.S. Pat. No. 4,739,451 Kuba, is the ability to have a keyboard made up of different sections in particularly a phone, numeric key pad and the QWERTY section.

SUMMARY OF THE INVENTION

To date the prior art has started to address the problem of the hand, wrist and forearm being at an angle causing CTDs.

It is therefor an object of this invention to address more of the ergonomic issues by having more versatile keyboards and computers with integral features that can be used in a more relaxed atmosphere in an operators lap or surface other than the surface normal to the host device. Wherein the integral keyboard with an activity area between two sections of the keyboard is split in a location that is optimized for the left and right hand for alpha data entry are only electrically connection to the host device, by which this electrical connection could be wires or transmitted and received by FM or other means, and the computer, keyboard and integral activity area keyboard slides apart or unfolds horizontally to maintain a more straight wrist position when inputting data and to keep a more perpendicular alignment of the arm and keyboard, and the arms parallel to each other.

A further object of this invention is to provide a keyboard that is fixed in a separated position that will address the majority of users with an integral activity area and reference material holder.

A further object of this invention is to provide in the activity area a means to hold reference material that is being used by the input person. Having the reference material between a persons hands keeps the head angle perpendicular to the input device, making a more normal position rather than having to look at different locations for reference material. This also allows for the reference material to be held by the keyboard when the user is using the keyboard on their lap or other surfaces than the host device.

A further object of this invention is to provide in the activity area a location for an input pointing device that is not necessarily attached to the keyboard. This allows for a pointing device that could be from a different manufacturer to be used on the keyboard when the keyboard is being used on their lap or other surfaces than the host device. This also allows for the pointing device to be operated with the left and right hand.

When operating a battery powered laptop computer on a persons lap the laptop must be out near the knees in order to have the persons hands close enough together to operate the keys, or the person must have a very acute angle in their wrist. Therefore it is a further object of this invention to have the keyboard unfold or slide apart while remaining electrically and mechanically connected and offer the keys on the side of the laptop computer to relieve the CTDs and to make the computer more compact.

A further object of this invention is to have the laptop computer or keyboard operate with the keyboard separated or in the closed position.

A further object of this invention is to provide an ear phone or speaker on the keyboard or laptop computer for audible verbal enunciated responses of a key being depressed or messages from the computer to be used by a person that has a vision impediment, in a secure no light environment, e.g. like military, or when lower power is wanted by turning off the computer display.

Briefly, this invention contemplates having a keyboard that separates in a lateral opposing direction. Further the sections would slide or hinge apart to separate the keyboard. When the keyboard slides apart wires connect the two sides in a wire run, or flex around the hinge when opened. When the two sides are apart an integral activity area support for a pointing device and an integral reference material holder can be provided.

BRIEF DESCRIPTION OF THE DRAWINGS

The foregoing and other objects, aspects and advantages will be better understood from the following detailed description of a preferred embodiment of the invention with references to the drawings, in which.

DETAILED DESCRIPTION OF THE PREFERRED EMBODIMENT OF THE INVENTION

Figure 1:
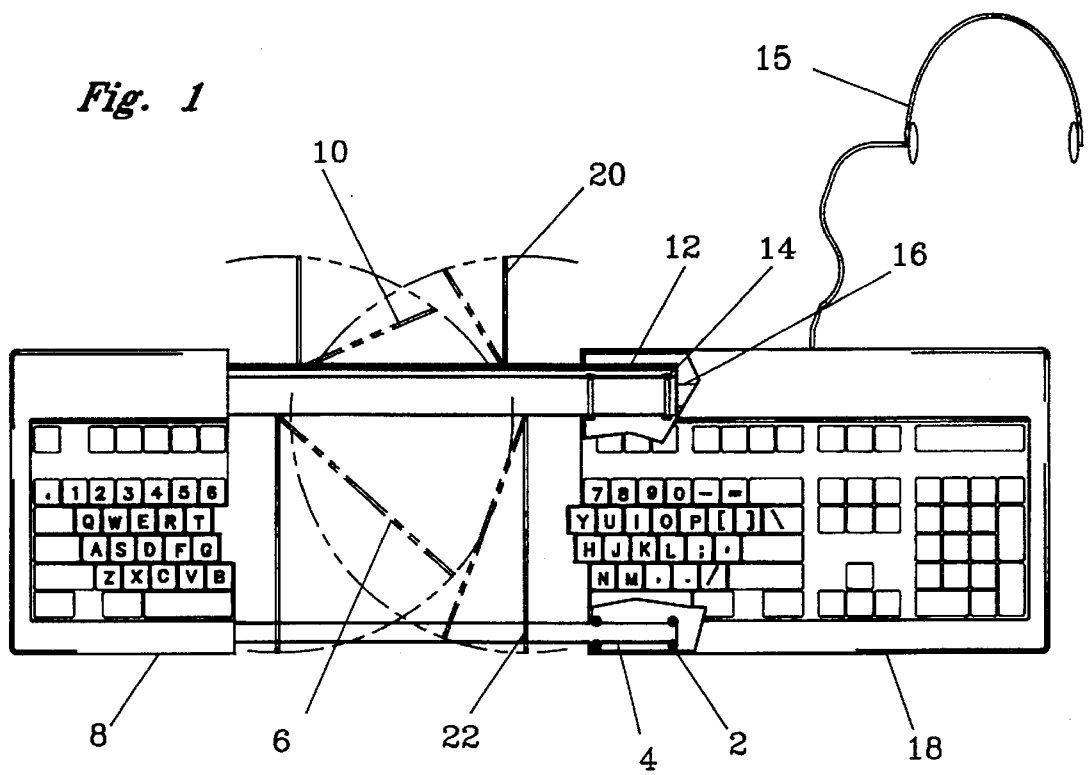
FIG. 1 is a plan view, with the keyboard separated, of the keyboard with an integral adjustable reference material holder and an integral activity surface support in the middle of the keyboard and an ear phone in accordance with the teachings of this invention.

Referring now to the drawings, in which the same reference numeral indicates the same element in the various figures, FIG. 1 shows the keyboard in an open position in which the left side 8 of the keyboard is connected to the right side 18 by two slide arms 4 and 12. The slide arms 4 and 12 are affixed to left side 8 and slide through guides 2 and upper rear guides 14 that are affixed to the right side of the keyboard. Slide arm 12 has an opening down the center axis that is used as a wire run for wires 16 that connect the two halves of the keyboard. The activity surface supports 22 rest on the slide arm 4 and pivot from slide arm 12 in the arc 6 formed by support 22. The reference material holder 20 pivots from slide arm 12 in the arc 10 formed by holder 20. Small and large computers all consume power and the display is one of the components that uses a good portion of that power. The ear phones 15, in which could be a speaker, are plugged into the keyboard 18 and are to be used when the host display can be turned off. The turning off and on would be through the keyboard keys utilizing the circuit shown in the block diagram in FIG. 10 or in the case of lower power, a switch could be used. This turning on and off could be at times but not limited to, word processing, answering verbal questions via modem or voice lines, when in low or non lighted areas, when a military person is on the front lines, by a person that has a vision impediment, to save power or in times that the computer is unattended, like waiting for a FAX. The response through the ear phones could be, but not limited to, actual verbal letters, correcting your spelling of what you are writing and verbal enunciation of the completed typed word. It should be appreciated that this enunciation message could be in any language and a chip set for the speech electronics can be purchased from various manufacturers.

The separation between the two sides 8 and 18 is made where the right and left hand keys are optimized for those skilled in the art of speed typing would be best accommodated. This could include but not limited to a QWERTY or Dvorak configuration of keys. This split location lets the operator touch type with their hands separated.

Figure 2:
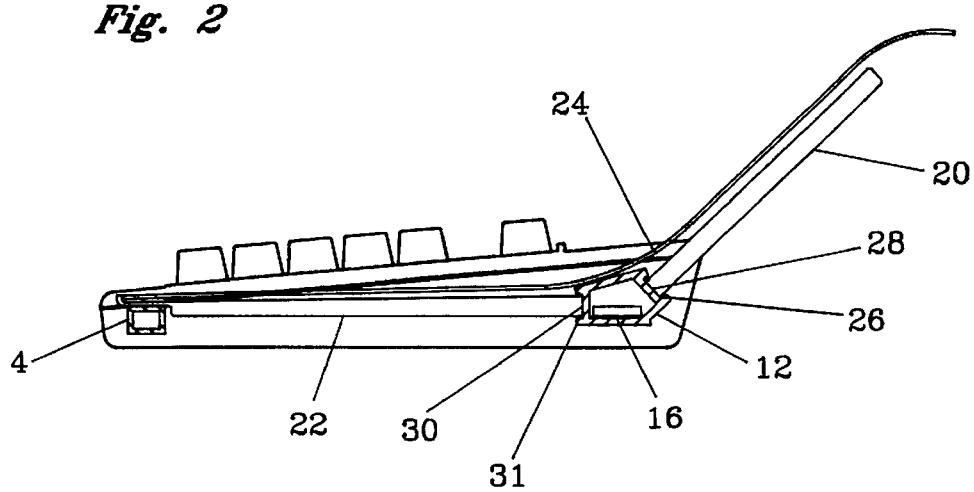
FIG. 2 is a section view through the activity area showing the reference material holder and activity surface support pivot points, channel where material holder and support are stored in the closed position and the interconnecting wire and wire run in accordance with the teachings of this invention.

FIG. 2 shows reference material holder 20 and the pivot pin 26 in the channel 28 of the slide arm 12. FIG. 2 also shows activity surface support 22 and pivot pin 31 in the channel 30 of slide arm 12. The holder 20 and support 22 in the closed position are coplanar with the outer surfaces of channel 28 and 30 respectively, so when the keyboard is closed the two sections can slide together. The wires 16 are supported in the wire run formed by rear slide arm 12 as the keyboard is extended or closed.

Figure 3:
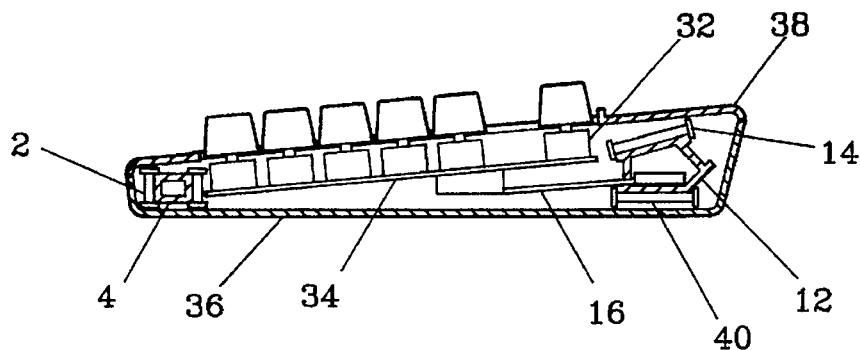
FIG. 3 is a cross section through the keyboard switches, printed wiring board and wire run in accordance with the teachings of this invention.
Figure 4:
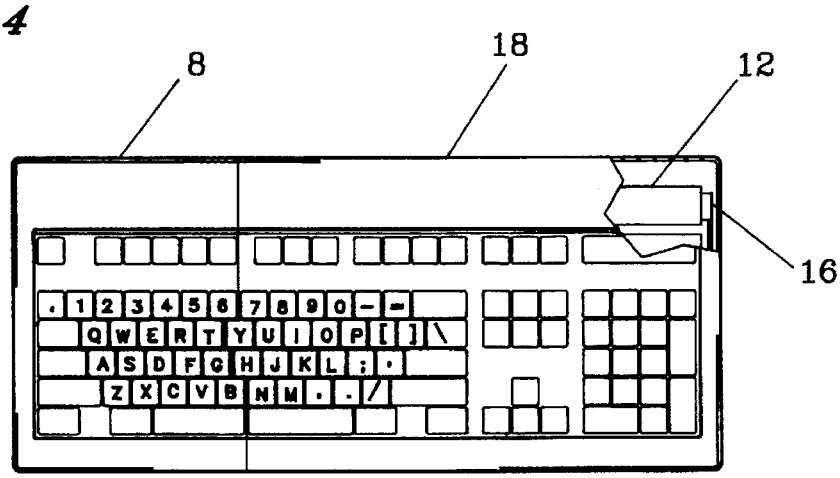
FIG. 4 is a plan view of the keyboard in the closed position and showing the interconnecting wire protruding out of the wire run with the keyboard in the closed position in accordance with the teachings of this invention.

FIG. 3 shows the top 38 and bottom 36 of the keyboard that comprises the right side 18 of FIG. 4 and housing the key switches 32 that are connected to the printed wiring board 34. Upper guides 14 and lower guides 40 form a track that facilitates the sliding of slide arm 12. Guides 2 form a track that facilitates the sliding of slide arm 4. The wires 16 that are in the right end of rear slide arm 12 connect to printed wiring board 34 and to the left side of the keyboard.

FIG. 4 shows the left side 8 and right side 18 of the keyboard in the closed position and with slide arm 12 supporting wires 16.

Figure 5:
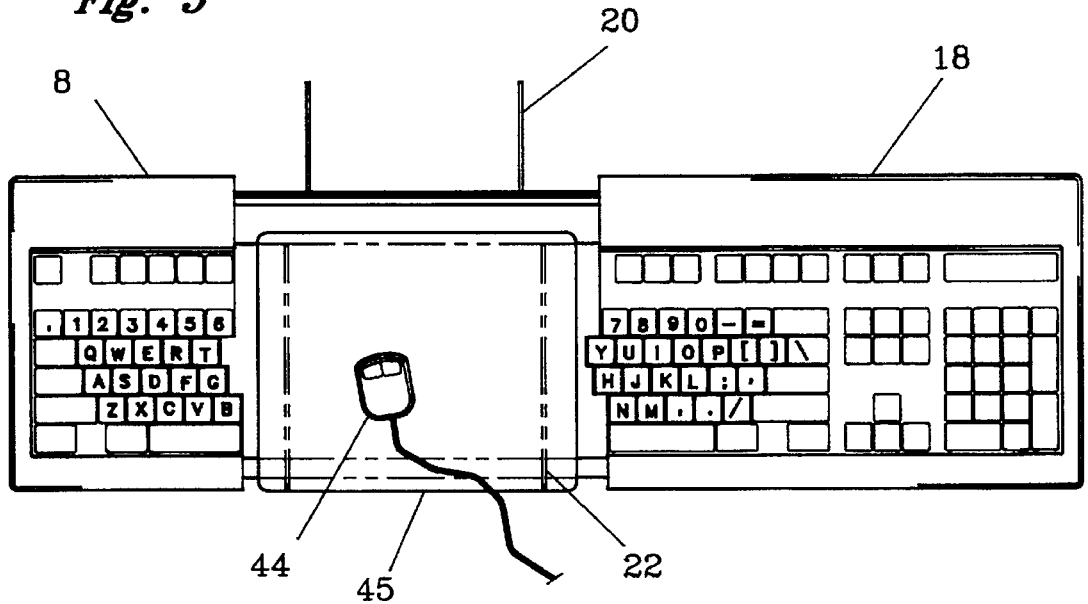
FIG. 5 is a plan view showing the keyboard in a separated position, a pointing device on an activity surface in the middle of the keyboard and the slides connecting the two sides of the keyboard in accordance with the teachings of this invention.

FIG. 5 shows a pointing device on the an activity surface resting on the supports 22.

Figure 6:
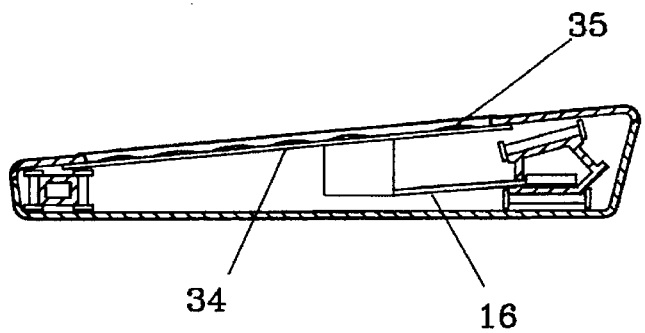
FIG. 6 is a cross sectional side view of the keyboard showing a membrane type of switch being used in accordance with the teachings of this invention.

FIG. 6 shows a section view exposing printed wiring board 34 with membrane switches 35 and connecting wires 16. Membrane sealed technologies would allow the keyboard to be used in harsh industrial environments. It should be appreciated that the switches could be any of the sealed technologies, e.g. capacitive discharge, resistive, surface acoustic, sub-surface acoustic, etc., or infrared.

Figure 7:
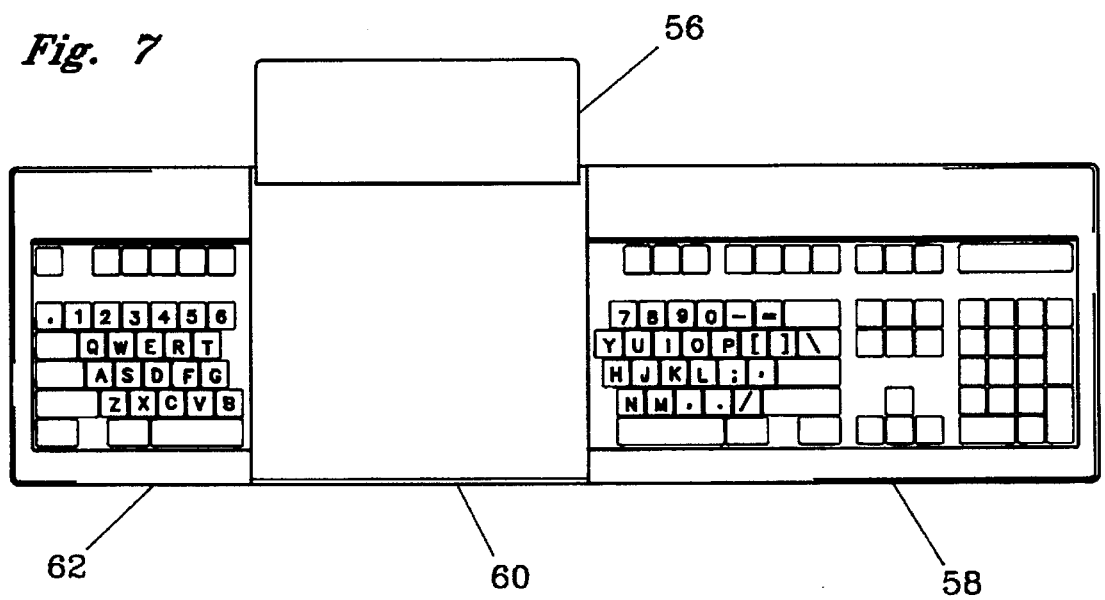
FIG. 7 is a plan view of the keyboard in a fixed position configuration in accordance with the teachings of this invention.
Figure 8:
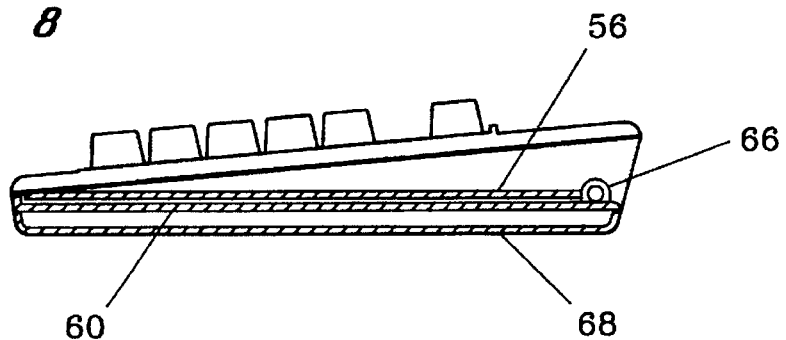
FIG. 8 is a cross section through the fixed position keyboard with a hinging reference material holder in the closed position in accordance with the teachings of this invention.
Figure 9:
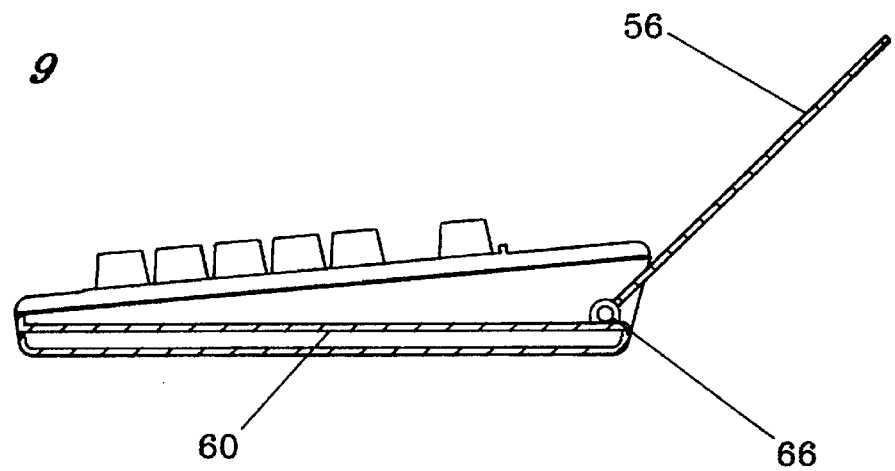
FIG. 9 is a cross section through the fixed position keyboard with the hinging reference material holder in the open position in accordance with the teachings of this invention.

FIG. 7 shows the keyboard with the left side 62 and the right side 58 in a fixed open position with the activity surface 60 in the middle of the keyboard. The reference material holder 56 is shown in the open position and in FIG. 8 the holder 56 is in the closed position allowing for the rear of holder 56 to be as an activity surface area to be used for but not limited to a pointing device or hand writing. The activity surface 60 and lower cover 68 make the physical connection between the left side 62 in FIG. 7 and the right side 58 to be a fixed position keyboard. FIG. 8 and FIG. 9 show a pivot hinge 66 that allows for movement of the holder 56.

Figure 10:
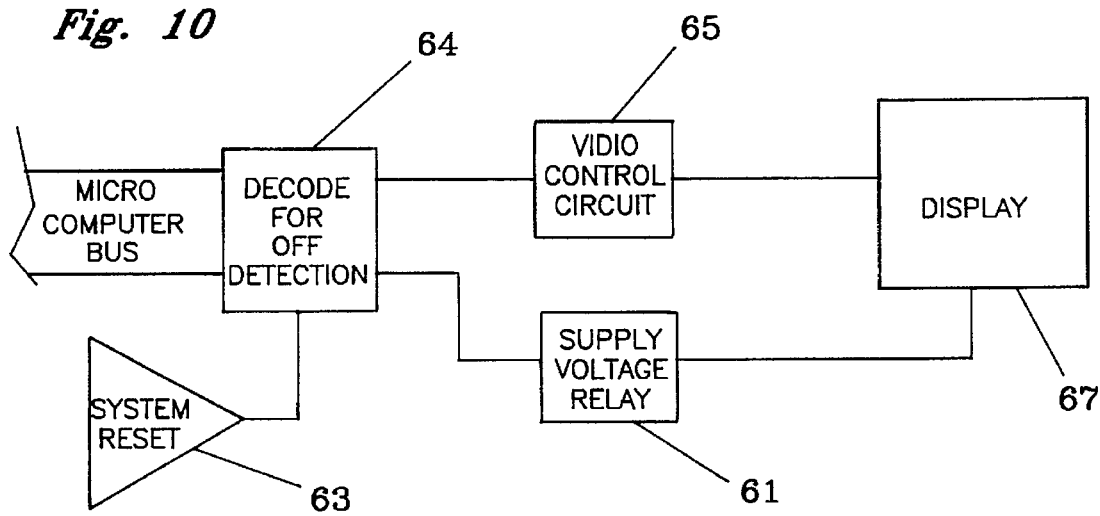
FIG. 10 is a block diagram of a circuit to turn off and on the display.

FIG. 10 shows a block diagram of a circuit to turn the display on and off. The decoder 64 monitors the computers bus waiting for a code from the keyboard to turn off the display 67. When the correct code is decoded at 64 it signals the video circuit 65 to turn of the video to the display, it should be appreciated that this video signal could be RGB, composite video or other suitable signals for controlling the monitor. The supply voltage relay 61 is connected to the computer power source and when the signal from decoder 64 is sensed it disconnects power to the monitor. The system reset 63 resets the decoder 64 to the on position thus setting the monitor back to the on state. Those skilled in the art should realize there could be another codes decoded at decoder 64 to turn the monitor to the on state without requiring a system reset. A laptop computer because of the lower voltage could replace the circuit in FIG. 10 and have a switch to disconnect the battery power to the display that would not necessarily be in the keyboard pattern of keys.

Figure 11:
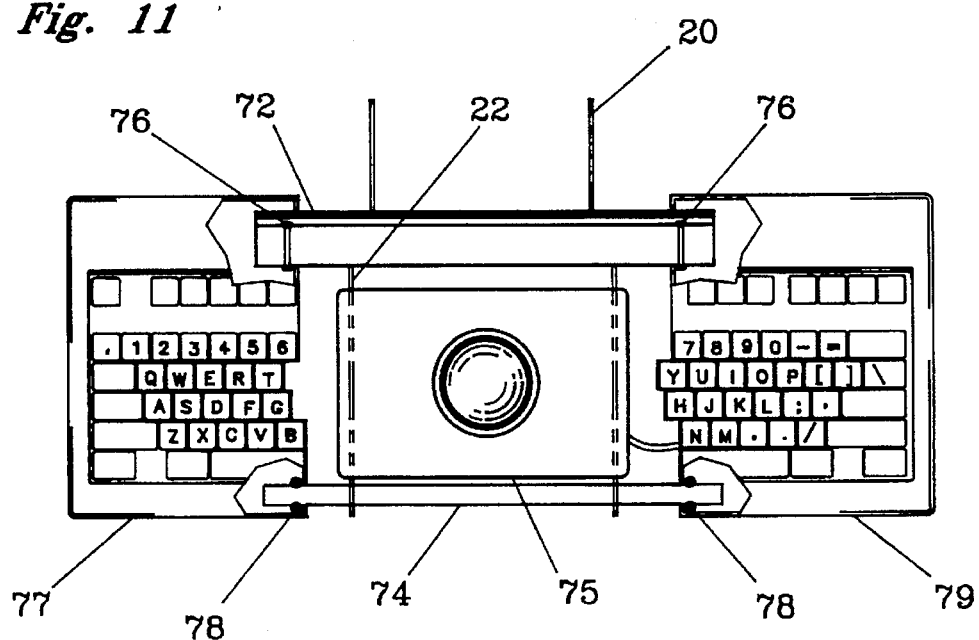
FIG. 11 is a plan view of the keyboard in the open position with a track ball type of pointing device resting on the activity surface support between the keyboard sections in accordance with the teachings of this invention.

FIG. 11 shows the keyboard with left side 77 and right side 79 are of similar size. Front slide arm 74 and rear side arm 72 slide in front guides 78 and rear guides 76 respectively. In this configuration both slide arms are free to move in either of the keyboard sides. A pointing device 75 can be placed between the two sides of the keyboard. As in FIG. 1 reference material holder 20 and activity surface support 22 fold into slide arm 72 to facilitate closing of the two sides of the keyboard.

Figure 12:
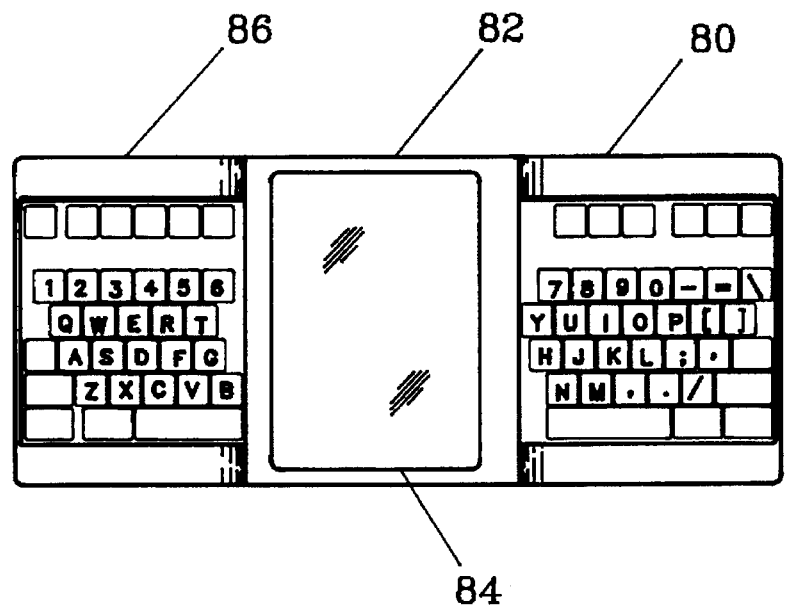
FIG. 12 is a plan view of a computer with the keyboard in the opened position utilizing the hinge type keyboard in accordance with the teachings of this invention.
Figure 13:
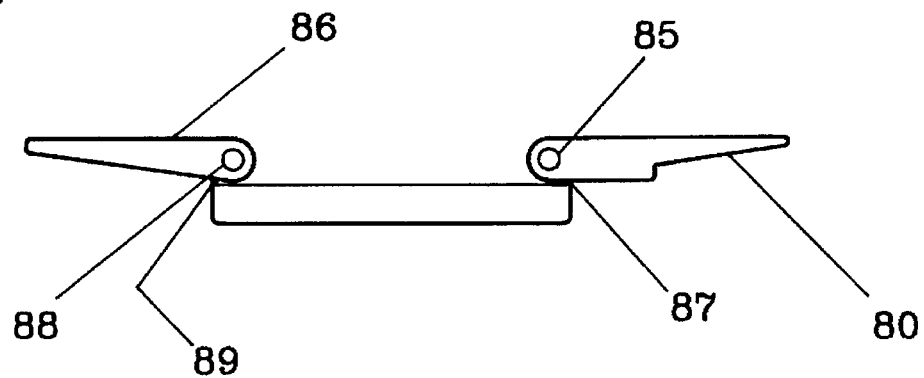
FIG. 13 is a front view of a computer with the keyboard in the opened position in accordance with the teachings of this invention.
Figure 14:
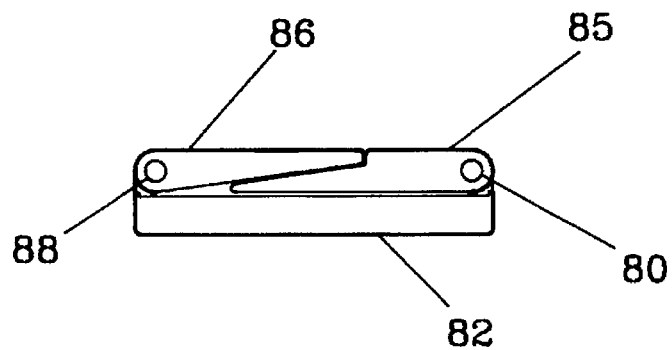
FIG. 14 is a front view of a computer with the keyboard in the closed position showing the interleaving of the two sections of the keyboard to make the computer more compact in accordance with the teachings of this invention.

The limiting factor in the width of small battery powered computers is the full size keys spaced with the normal pitch of about three quarters of an inch. FIG. 12 shows a small battery powered computer where left side 86 and right side 80 of the keyboard are hinged to either side of a computer processor 82 with a display 84. This display could be of the type as described in FIG'S. 15, 16 and 17 and fold over the keyboard. The display 84 could also be touch sensitive. The sides of the keyboard pivot to the closed position with the fulcrum being hinge 88 and 85 in FIG. 13. Keyboard supports 87 and 89 are integral to computer processor 82 to set the full open position of keyboards 80 and 86. Keyboard supports 87 and 89 restrain motion of keyboards 80 and 86 so they can be easily flipped open and be self supporting without other means for support. With the interleaving of the two sides of the keyboard shown in FIG. 14 the width of the computer in the closed position can be reduced and still accommodate full size keys at the normal pitch. The interleaving position as shown in FIG. 14 is formed when right side keyboard 85 is notched to a configuration to receive left side keyboard 86 so as to overlap. The cumulative thickness at the overlap is less than the sum of the maximum individual thicknesses of the left and right side keyboards 86 and 85 respectively. Furthermore now that the keyboard is not the width limiting factor the display can be turned ninety degrees or have a change in aspect ratio to decrease the width with the keyboard in the open and closed position. This would mean that the X dimension would be less than the Y dimension.

Figure 15:
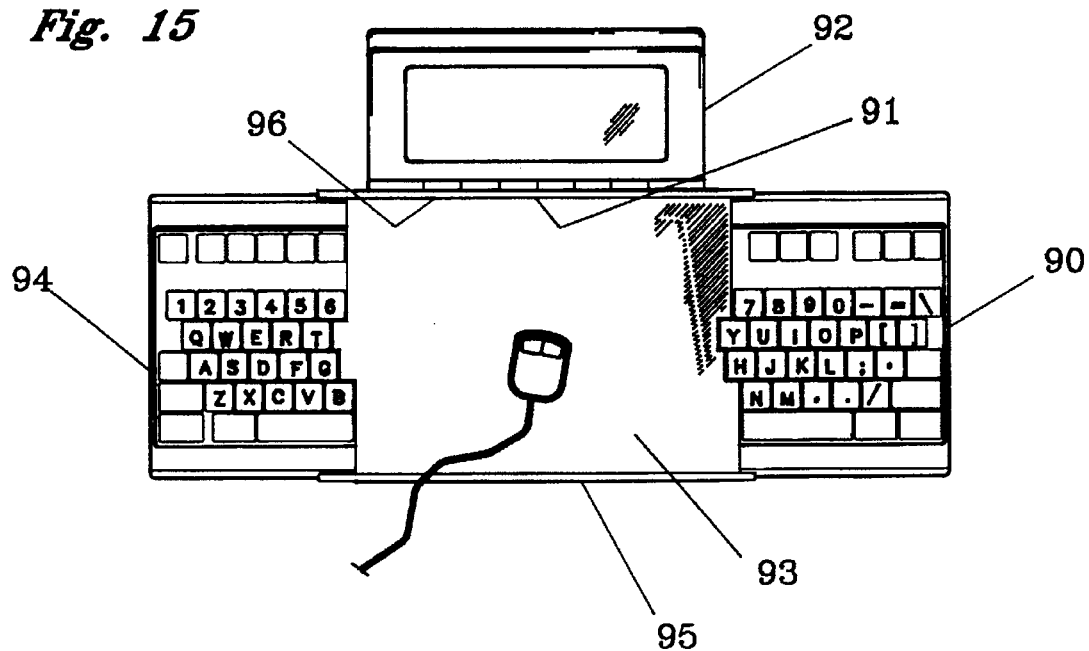
FIG. 15 is a plan view of a computer and hinged display with the keyboard that separates in a sliding motion and showing a pointing device on the activity surface in accordance with the teachings of this invention.
Figure 16:
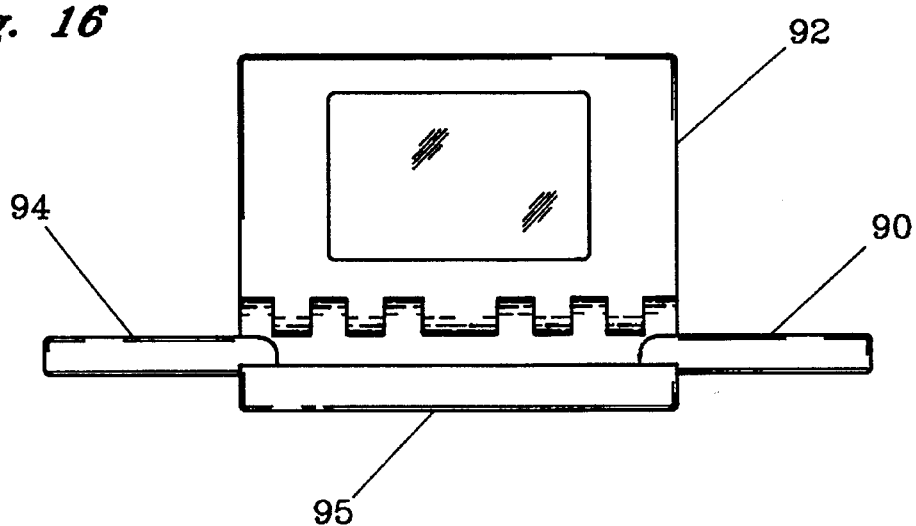
FIG. 16 is a front view of a computer and hinged display with the keyboard in a separated position in accordance with the teachings of this invention.
Figure 17:
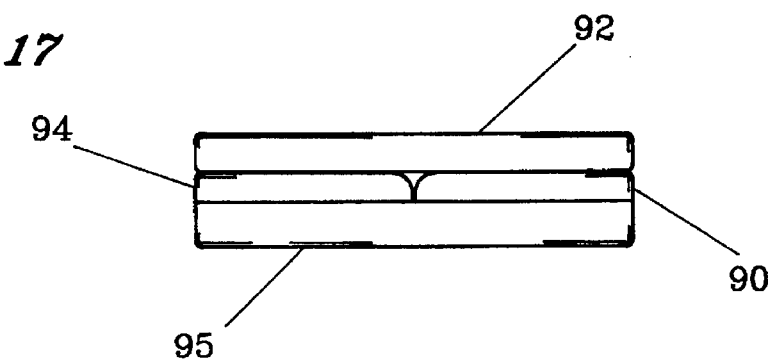
FIG. 17 is a front view of a computer and hinged display with the keyboard in the closed position in accordance with the teachings of this invention.

FIG. 15 shows a laptop computer with a computer processor 95 with left side 94 and right side 90 of the keyboard in the open position. Computer processor 95 has tracks 96 that are integral to the top of the computer that facilitate the sliding of the left side 94 and the right side 90 of the keyboard to an open or closed position. The location shown at 91 is where detents are placed to hold the keyboards in a closed position and are shown in detail in FIG. 30. These detents could be placed in multiple locations in the track 96 to hold the keyboards in various desirable positions. Display 92 can fold over the keyboard in the closed position as shown in FIG. 17. The computer can operate with the keyboard in the open or closed position. The top of computer processor 95 forms an activity surface area 93 between the keyboards for writing, a pointing device or other functions that could be preformed in that area. This area for the most part would be free of switches, holes or other features that would deter from use of the flat surface. A second display could also be in activity surface area 93 for viewing two sessions of a program running at the same time. The front view of the computer in FIG. 16 shows left side 94 and right side 90 of the keyboard and display 92 in the open position. FIG. 17 shows a front view of the computer with right side 90 and left side 94 of the keyboard and display 92 in the closed position.

Figure 18:
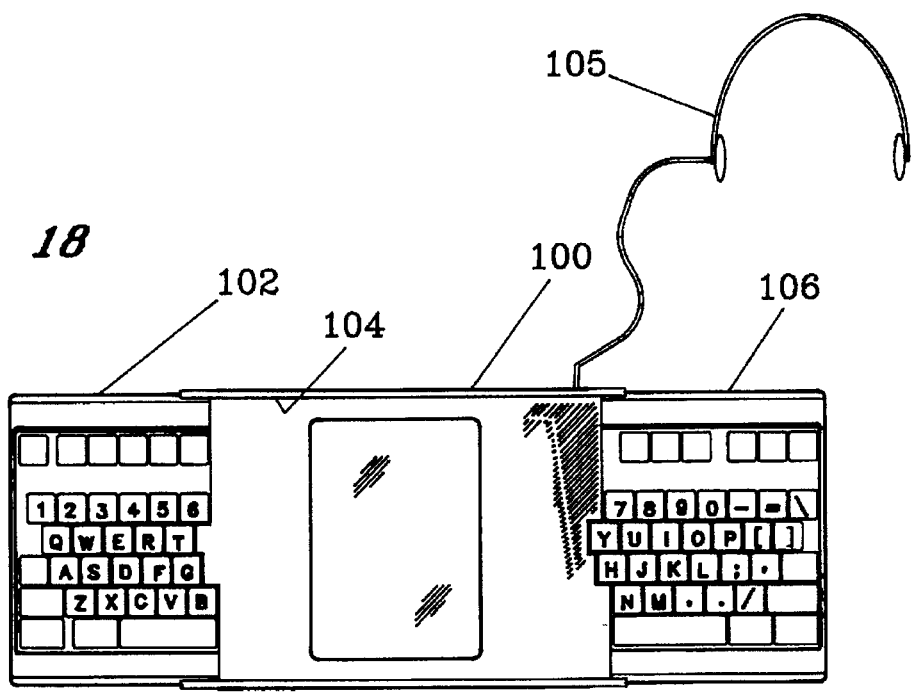
FIG. 18 is a plan view of a computer with the keyboard in an separated sliding position and an ear phone in accordance with the teachings of this invention.

FIG. 18 shows a computer with a computer processor 100 with left side 102 and right side 106 of the keyboard in the open position. The computer has tracks 104 that are integral to the top of the computer that facilitate the sliding of left side 102 and right side 106 of the keyboard to an open or closed position. Computer processor 100 can be operated with the keyboard in the open position with the display visible or in the closed position with the display covered. Ear phones 105 are plugged into computer processor 100 and are to be used when the display can be turned off, as discussed in reference to FIG. 1. The turning off and on would be through the keyboard as shown in FIG. 10.

Figure 19:
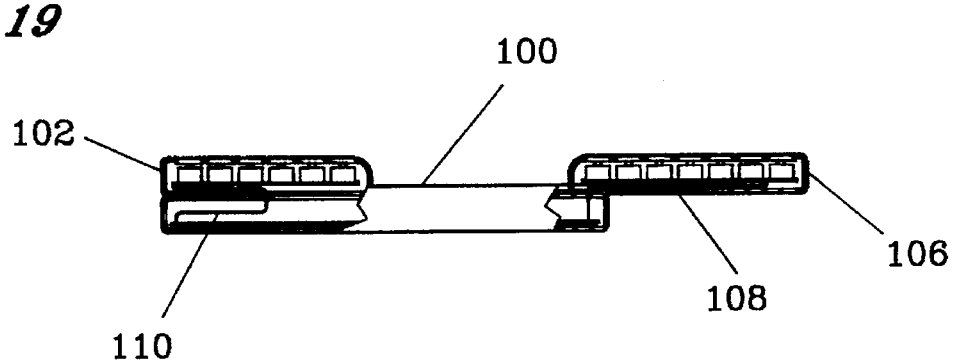
FIG. 19 is a front view of a computer with the sliding keyboard in the closed and open position in accordance with the teachings of this invention.
Figure 20:
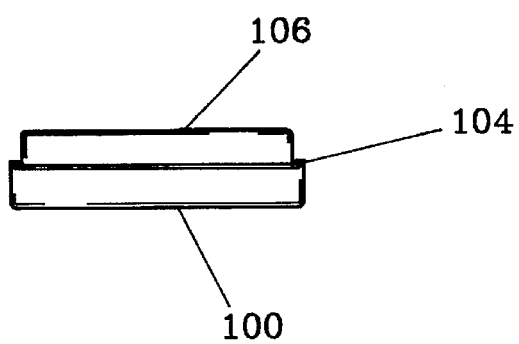
FIG. 20 is a side view of a computer with the sliding keyboard showing the sliding tracks.

In FIG. 19 computer processor 100 is shown with left side 102 of the keyboard in the closed position and right side 106 of the keyboard in an extended position. Wires for left side 110 and right side 108 are shown in the closed and extended position facilitating the operation in the open and closed position. FIG. 20 shows the right side view of the computer processor 100 and right side 106 of the keyboard with the integral tracks 104.

Figure 21:
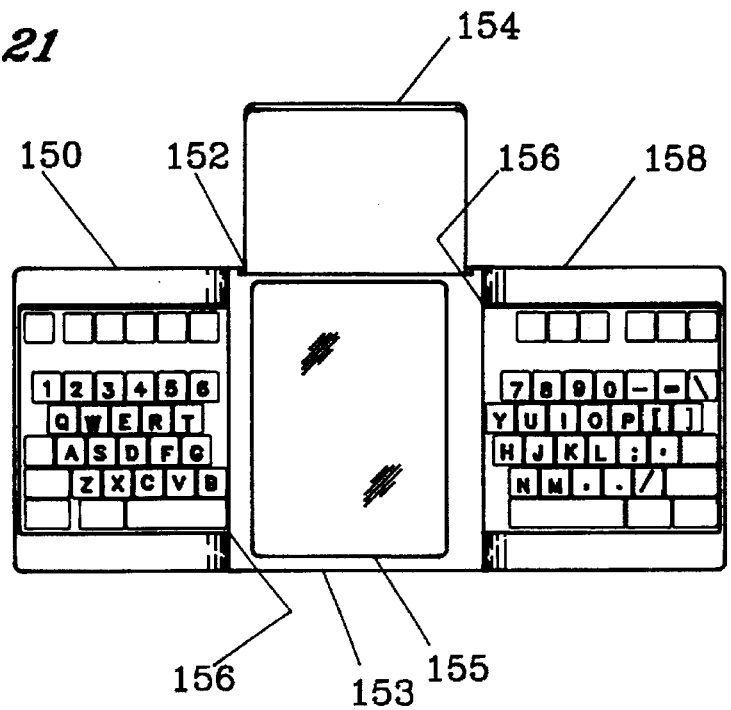
FIG. 21 is a plan view of a computer with the keyboard in the opened position utilizing the hinge type keyboard and a material holder in accordance with the teachings of this invention.
Figure 22:
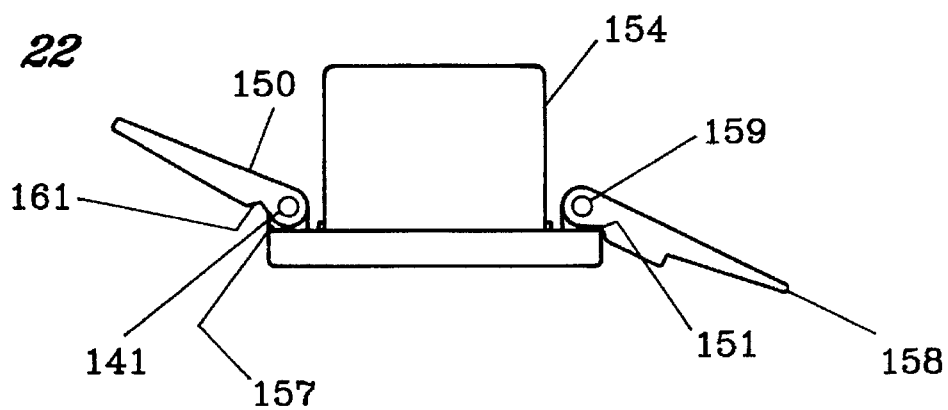
FIG. 22 is a front view of a computer with the keyboards detented in different angle positions in accordance with the teachings of this invention.

FIG. 21 shows a battery powered computer where left keyboard 150 and right keyboard 158 are hinged from either side of computer processor 153. Display 155 is in the top surface of computer processor 153. The top surface of display 155 and computer processor 153 are substantially flat and coplanar to allow for hand writing or other activities that would need a smooth surface. The display 155 could be touch sensitive. On the rear of the top surface of computer processor 153 reference material holder 154 is shown in an open position. Reference material holder 154 pivots from pivot 152 from an open position to a closed position over computer processor 153. FIG. 22 shows the freedom to which the angle of the keyboards could be operated. Left keyboard 150 and right keyboard 158 pivot from a closed position over the display to an open position from pivots 141 and 159. Keyboard supports 157 and 151 are integral to computer 153 to set the full open position of keyboards 150 and 158. Keyboard supports 157 and 151 restrain motion of keyboards 150 and 158 so they can be easily flipped open and be self supporting without other means for support. Notch 161 can be designed to set the angle of and where keyboards 150 and 158 contact supports 157 an 151. Supports 157 and 151 could also be adjustable so an operator could define at what position is most comfortable.

When a defined point at which the angle of the keyboards 150 and 158 are subject to change by different operators, various detents can be used to hold the keyboards 150 and 158 at any angle from the closed to an open position. One such detent is friction point 156 in FIG. 21. This type of detent Gives an infinite degree of angle restraint for the keyboards. Friction point 156 can be molded in with a Given interference that lets keyboards 150 and 158 when sliding against computer processor 153 cause friction, or a dissimilar material or wave type washer can be inserted to cause friction at friction point 156. This friction is what actually restrains the movement of the keyboard to hold, or detent, the keyboards in the position that an operator positions the keyboards. The actual amount of friction that is needed is small because it only needs to be enough to overcome the force of a keyboard key spring, or about two ounces.

Figure 23:
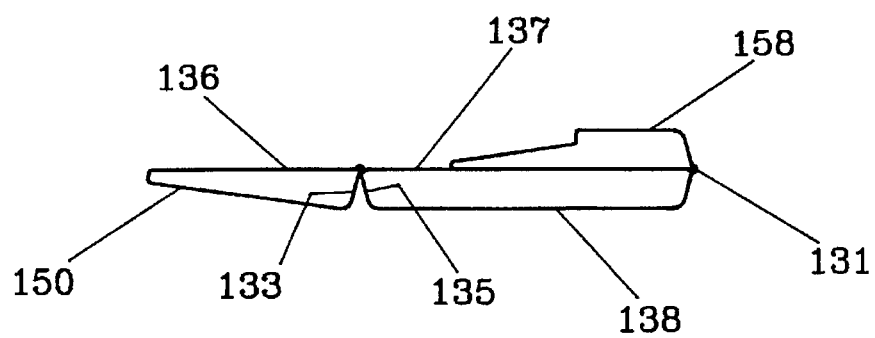
FIG. 23 is a front view of the computer with right and left keyboards with a smaller hinge allowing the tops of the keyboards and the computer to be coplanar in accordance with the teachings of this invention.

FIG. 23 shows a computer processor 138 with a left keyboard 150 in an open position and a right keyboard 158 in a closed position. Hinge 131 is indicative of both sides of the computer processor 138 and allows for the keyboards to rotate from an open position to a closed position where the top of computer processor 137 and the top of the keyboards 136 when horizontal are on the same plane. The only part above this plane is half of hinge 131. The angles on the side of computer processor 135 and on the side of the keyboards 133 can be molded so when in contact will produce the full open position of the keyboards, which can be angles Greater than the horizontal plane. The detent mechanism in FIG. 29 can be used to detent the keyboards in the closed position, and frictional detents can be used throughout the angular adjustment of the keyboard.

Figure 24:
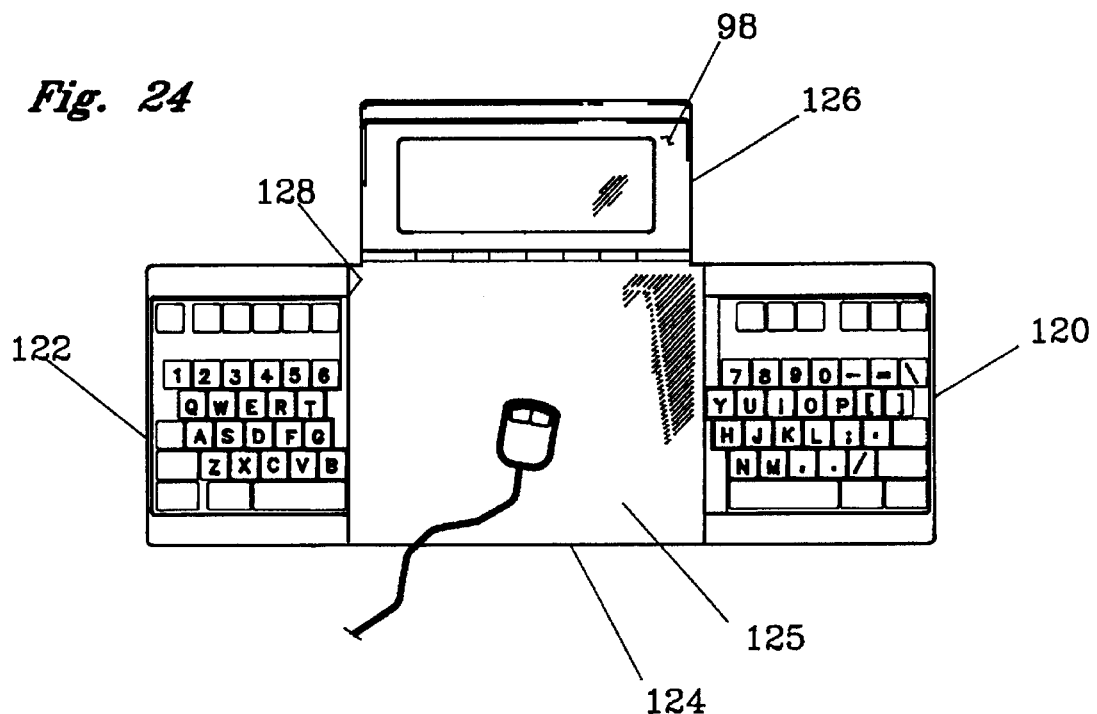
FIG. 24 is a plan view of a computer and hinged display with material holder, the keyboard that rotates to an open position and showing a pointing device on the activity surface in accordance with the teachings of this invention.
Figure 25:
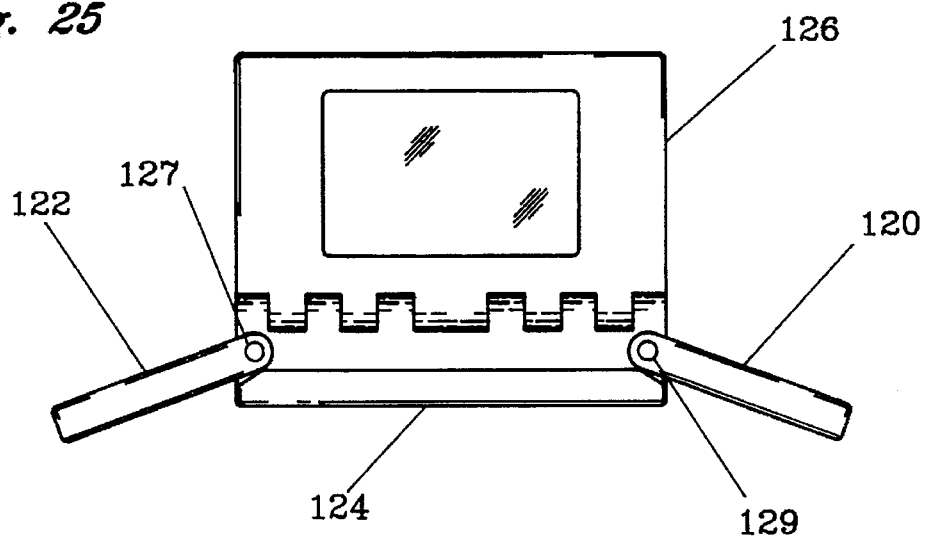
FIG. 25 is a front view of a computer and hinged display with the keyboards detented in different angle positions in accordance with the teachings of this invention.
Figure 26:
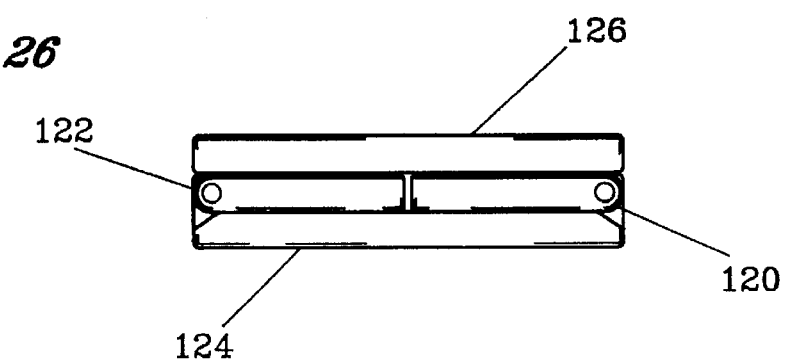
FIG. 26 is a front view of a computer and hinged display with the keyboards in the closed position in accordance with the teachings of this invention.

FIG. 24 shows a computer processor 124 with a left keyboard 122 and right keyboard 120 in an open position. The front face 98 of display 126 can be used as a material holder to support documents when inputting data. The keyboards pivot from an open to a closed position from pivots 127 and 129 in FIG. 25. The display 126 can fold over keyboards 120 and 122 in the closed position as shown in FIG. 26. The top of computer processor 124 forms a substantially flat surface 125 between the keyboards for hand writing, a pointing device or other functions that could be preformed in that area. This area for the most part is free of switches, holes or other features that would deter from use of the flat surface. This is not to say that switches could not be around the periphery of this area or that membrane switches or other like switches could not be in this surface. FIG. 24 shows left keyboard 122 and right keyboard 120 and display 126 in an open position. Friction point 128, like friction point 156 in FIG. 21, can detent the left and right keyboards in an infinite degree of angular adjustment. FIG. 25 shows left keyboard 122 and right keyboard 120 in a position below a horizontal plane where the tops of the keyboards would be parallel. This position would be advantageous when holding the computer on an operators lap because the lower sides of the keyboards would be in contact with the operators legs and would centralize the computer over the lap and the attitude of the keys would also relieve some of the twist between the hand and wrist. FIG. 26 shows a front view of computer processor 124 with right keyboard 120 and left keyboard 122 and display 126 in a closed position.

Figure 27:
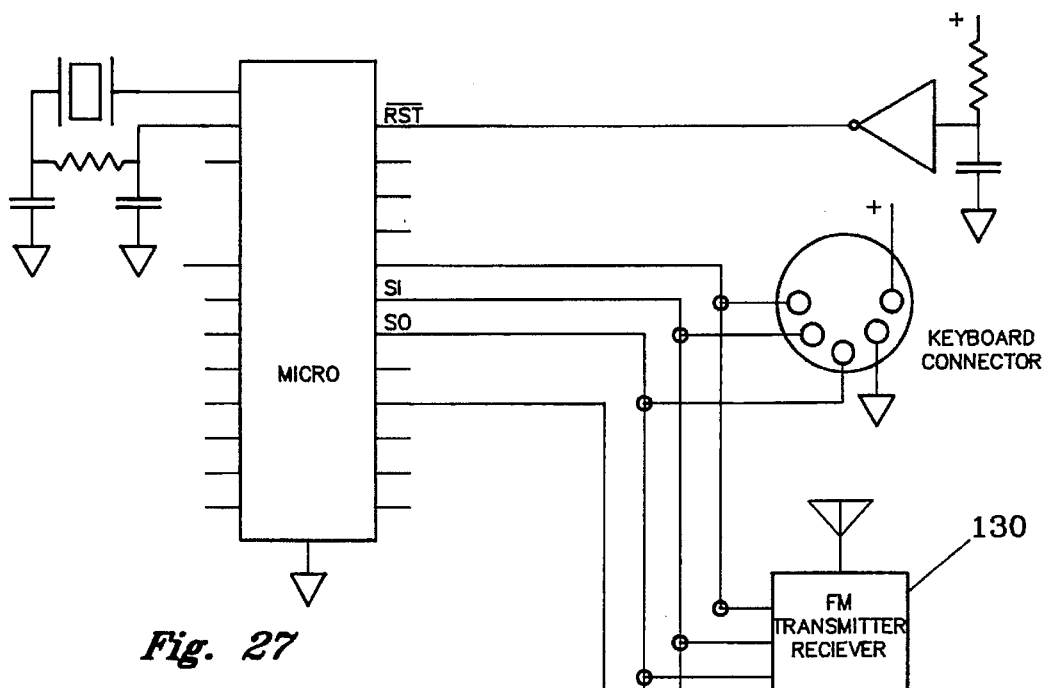
FIG. 27 shows the FM transmitter and receiver and speaker in accordance with the teachings of this invention.

FIG. 27 shows the micro in the keyboard with FM transmitter and receiver 130 for communicating with a host computer with radio frequency signals. Speaker circuit 132 and speaker 134 let the operator receive enunciated audible verbal responses from the host or keyboard entry.

Figure 28:
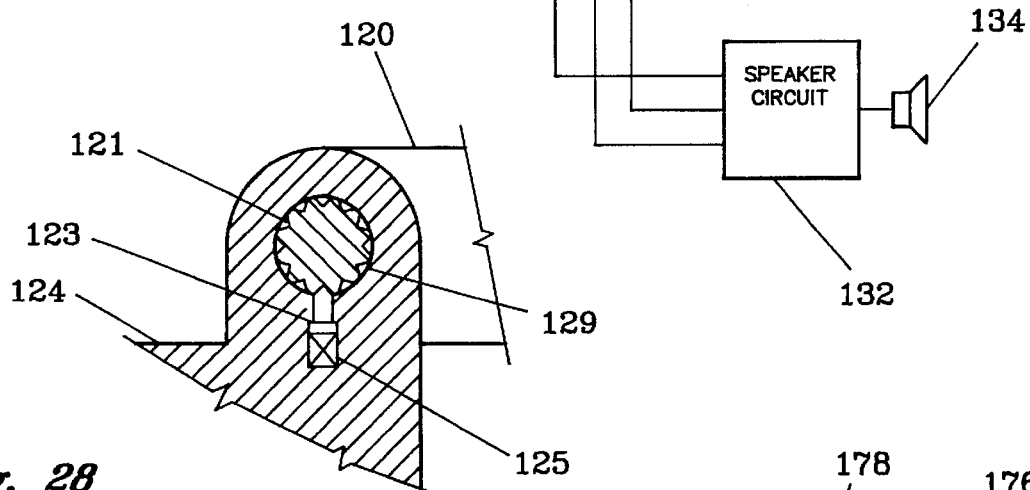
FIG. 28 is a section view showing one type of detent mechanism for holding the keyboards at different angle positions in accordance with the teachings of this invention.
Figure 29:
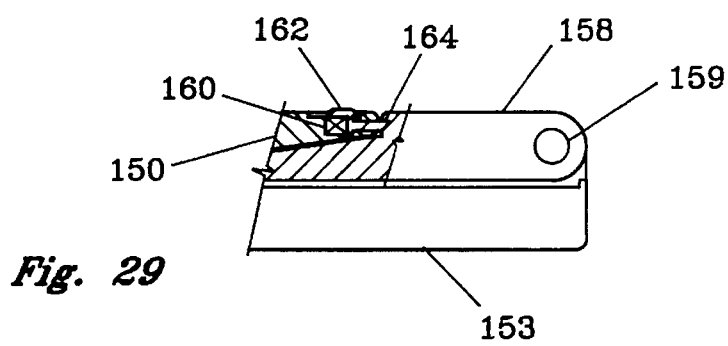
FIG. 29 is a section view showing one type of detent mechanism for holding the keyboards at different angle positions in accordance with the teachings of this invention.
Figure 30:
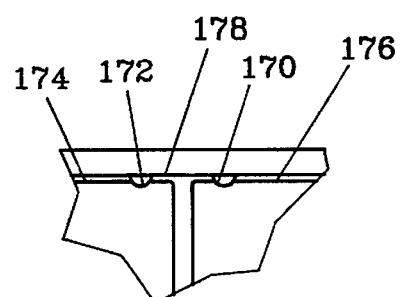
FIG. 30 is a view showing one type of detent mechanism for holding the keyboard at a position in accordance with the teachings of this invention.

FIG. 28 shows another detent mechanism that can be used in place of, or with, friction point 156 in FIG. 21 or 128 in FIG. 24. Pivot 129 in computer housing 124 allows keyboard 120 rotate. Spring 125 applies pressure on detent pin 123 that detents the position of keyboard 120 at various angles defined by notches 121 that are attached to keyboard 120. FIG. 29 shows another detent mechanism that can be used with or without the friction point 156 in FIG. 21 or 128 in FIG. 24. Computer processor 153 retains pivot 159 in which right keyboard 158 rotates. Spring 160 applies pressure on pin 164 that is attached to button 162. Pin 164 slides in left keyboard 150 and engages right keyboard 158. Button 162 is used to disengage pin 164 from right keyboard 158. FIG. 30 shows another detent mechanism in which the surface of the keyboard that is in track 178 is notched to allow the detent fingers 170 and 172 to engage keyboards 174 and 176. Detent fingers 170 and 172 deflect until they engage recesses in keyboards 174 and 176.

Figure 31:
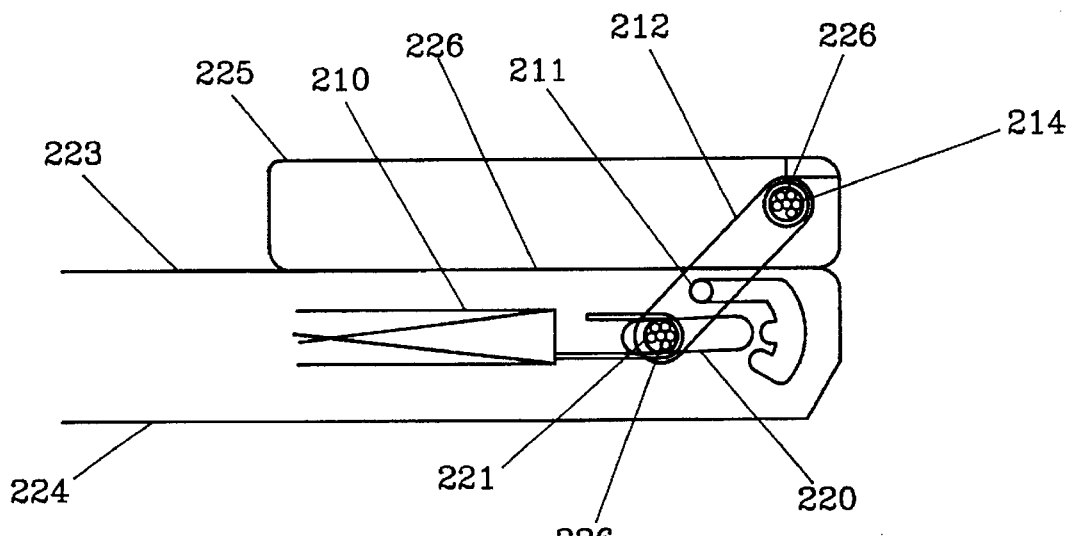
FIG. 31 is a schematic side view showing a keyboard in the closed position by a positioning mechanism whereby the keyboard is held in a closed position, and detented in various open positions in accordance with the teachings of this invention.

FIGS. 31 through 37 show a mechanism that holds the keyboards in a closed position, and allows them to be opened and detented in multiple positions. Computer processor 224 of FIG. 31 is shown with a keyboard side 225 and is connected by hollow link 212. Connecting wires 226 can be routed through hollow link 212 so these wires can be hidden. A spring 210 holds lower link pin 221 that is slidable received in angled slot 220 that the angle is divergent from the top surface 223 of computer processor 224. The force applied by spring 210 is exerted through the upper link pin 214 to keyboard side 225, thus forcing the key side 226 of keyboard side 225 to lock against the top surface 223.

Figure 32:
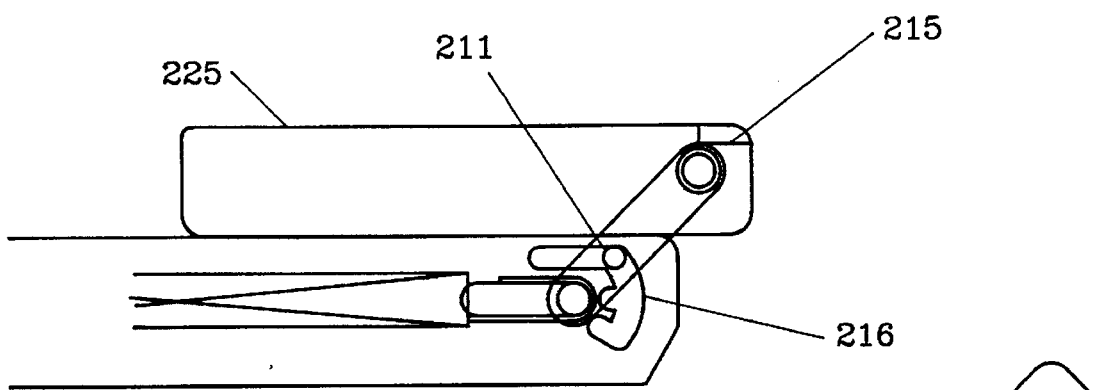
FIG. 32 is a schematic side view showing the keyboard of FIG. 31 in the unlocked position by a positioning mechanism in accordance with the teachings of this invention.
Figure 33:
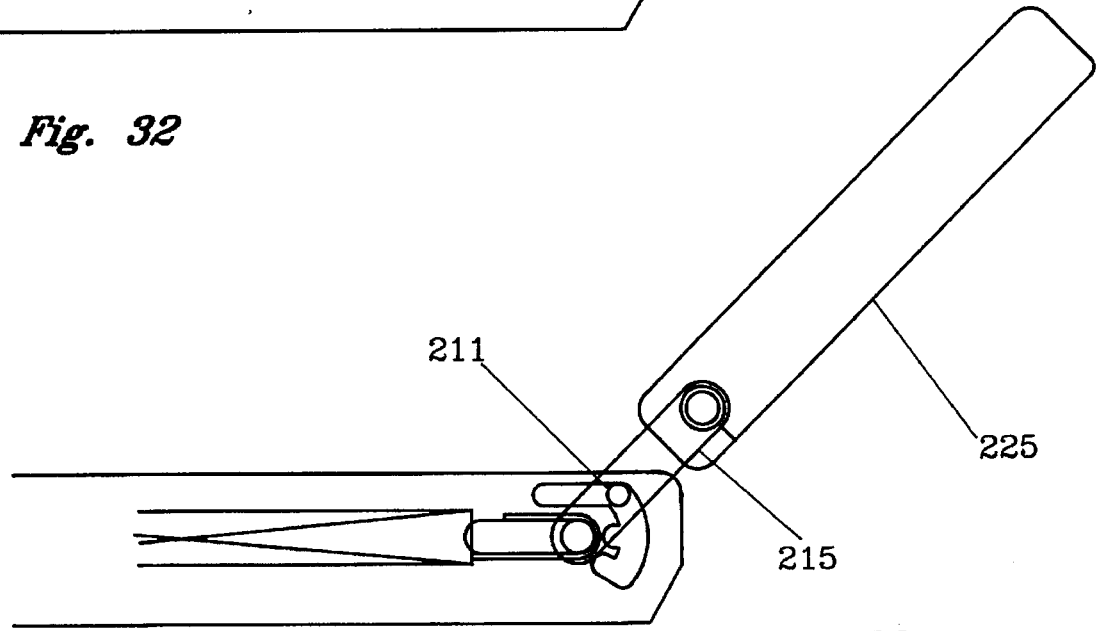
FIG. 33 is a schematic side view showing the keyboard of FIG. 31 in a rotated position by a positioning mechanism in accordance with the teachings of this invention.
Figure 34:
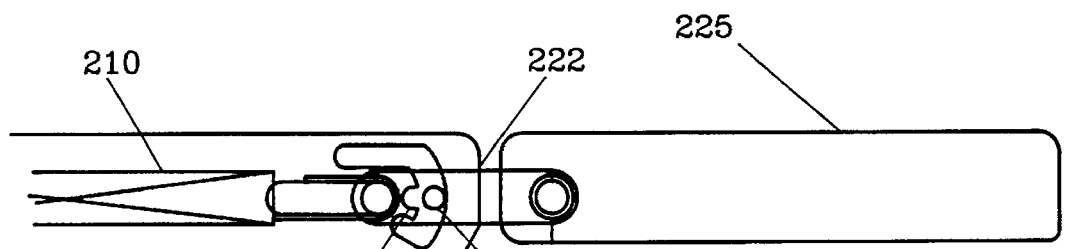
FIG. 34 is a schematic side view showing the keyboard of FIG. 31 in a open position prior to being detented by a positioning mechanism in accordance with the teachings of this invention.
Figure 35:
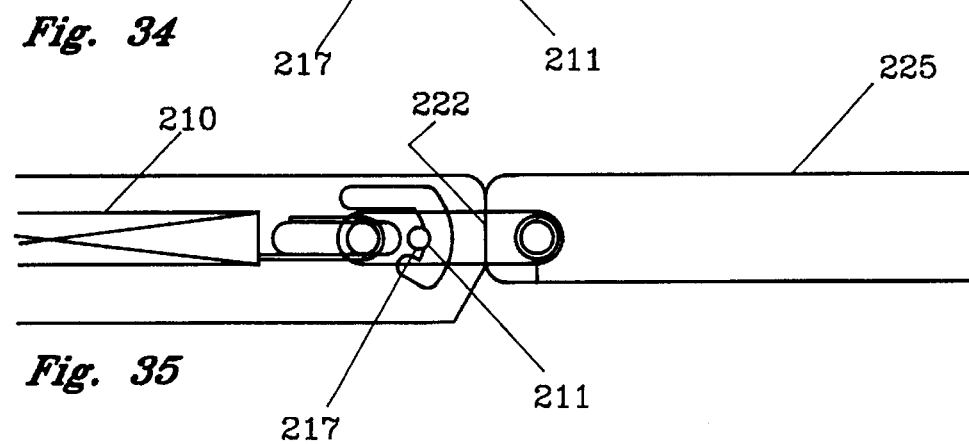
FIG. 35 is a schematic side view showing the keyboard of FIG. 31 in a open position detented in a horizontal plane by a positioning mechanism in accordance with the teachings of this invention.
Figure 36:
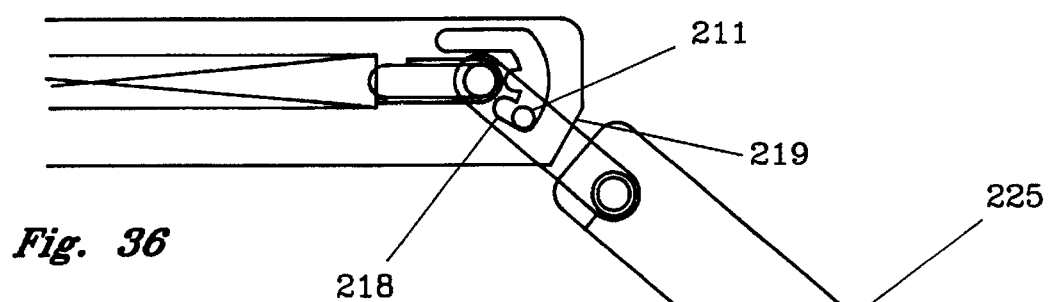
FIG. 36 is a schematic side view showing the keyboard of FIG. 31 in a open position prior to being detented at an angle greater than a horizontal plane by a positioning mechanism in accordance with the teachings of this invention.
Figure 37:
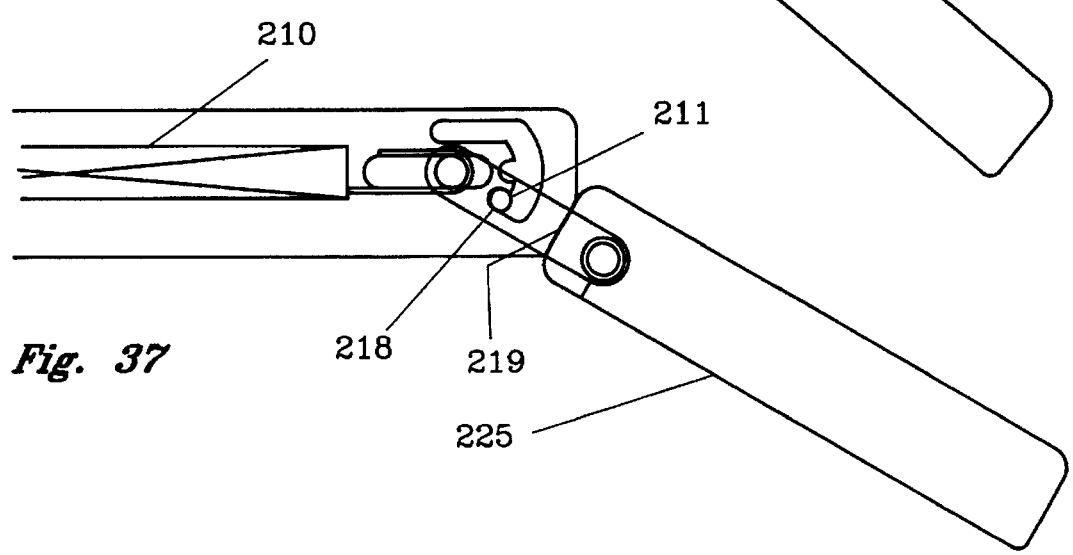
FIG. 37 is a schematic side view showing the keyboard of FIG. 31 in a open position detented at an angle greater than a horizontal plane by a positioning mechanism in accordance with the teachings of this invention.
Figure 38:
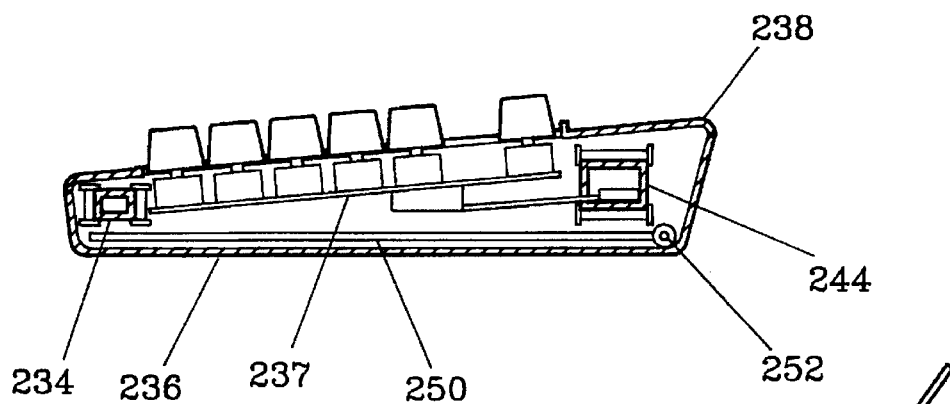
FIG. 38 is a cross sectional side view of a slide apart keyboard showing a solid material holder held below the keys in accordance with the teachings of this invention.
Figure 39:
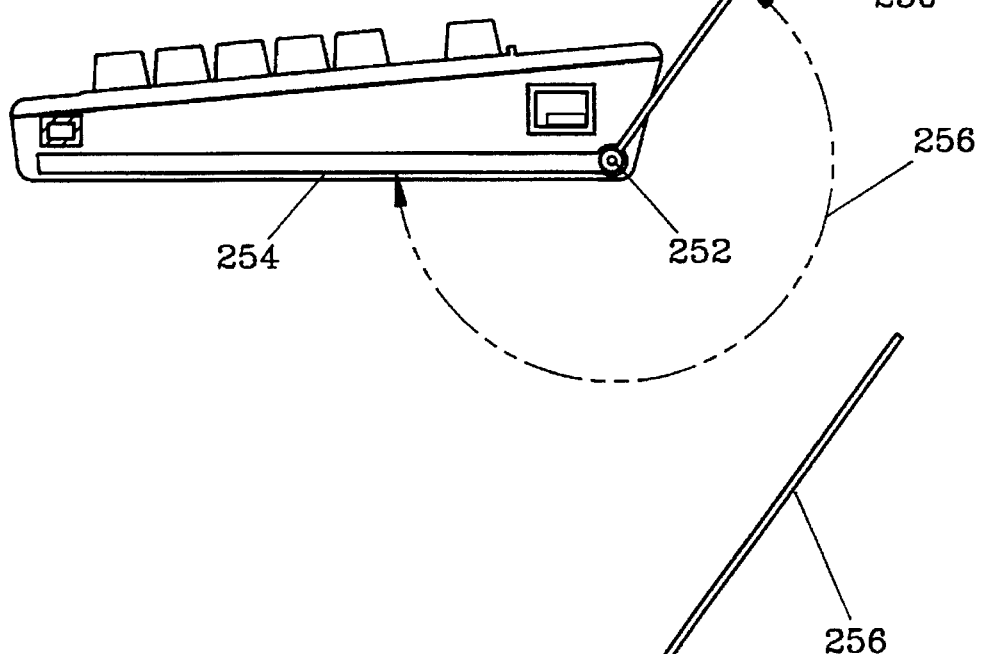
FIG. 39 is a cross sectional side view of the slide apart keyboard of FIG. 38 showing a solid material holder rotated into the open position in accordance with the teachings of this invention.

To open the keyboard, keyboard side 225 is moved to the right until, as shown in FIG. 32, locking pawl 211 contacts stop radius 216. At that point the keyboard can be rotated, as shown in FIG. 33, until stop surface 215 contacts hollow link 212, and then rotation of both together to the horizontal position, as shown in FIG. 34. Releasing keyboard side 225 allows spring 210 to engage locking pawl 211 in horizontal lock slot 217, and coming to rest against computer processor side 222, as shown in FIG. 35. To move the keyboard to another detented position, keyboard side 225 is moved to the right until locking pawl 211 contacts stop radius 216 and then rotated, as shown in FIG. 36. Releasing keyboard side 225 allows spring 210 to engage locking pawl 211 in an angled lock slot 218, and then coming to rest against computer processor angled side 219, as shown in FIG. 37. It can be appreciated that more angled positions could be incorporated. This locking mechanism is most advantageous to keep the top of the computer and keyboards coplanar when in the horizontal position, and to have the simplicity of operation when positioning the keyboard sides. FIGS. 38 and 39 show a keyboard that slides apart and has an integral material holder attached to one of the two sides nested in a closed position in the lower part of the keyboard and can be rotated to an open position when the keyboards are slid apart. FIG. 38 shows a section view through one side of the keyboard with a solid material holder 250 and pivot 252 under printed wiring board 237. Upper housing 238 and lower housing 236 form the outer shell of the keyboard. Rear slide 244 and front slide 234 support both sides of the keyboard when the sides are slid apart to the open position. FIG. 39 is a section view through rear slide 244 and front slide 234 of the keyboard when both sides are slid apart. Pivot 252 is attached to one side of the keyboard, solid material holder 250 is nested in slot 254 and is exposed when the two sides of the keyboard are slid apart. Solid material holder 250 then is free to rotate through arc 256 from a stored position to an open position, as shown.

Figure 40:
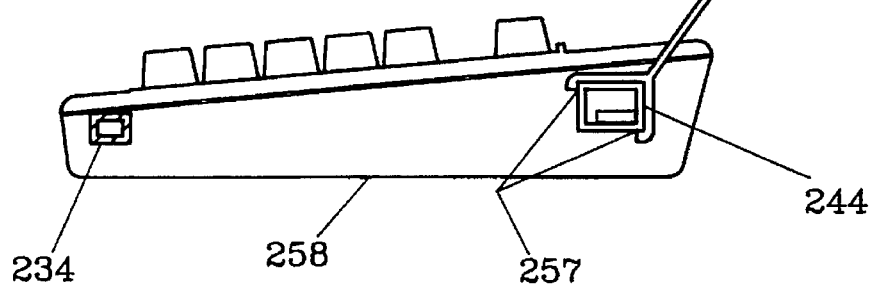
FIG. 40 is a cross sectional side view of the slide apart keyboard of FIG. 38 showing a removable material holder snapped on in the open position in accordance with the teachings of this invention.

FIG. 40 is a section view through rear slide 244 and front slide 234 of the keyboard when both sides are slid apart. Material holder 256 is stored in the keyboard and when the two keyboard sides are slid apart, is removed and snapped on rear slide 244 when being used, and then detached and stored again when the keyboard is slid together or closed. Material holder can also be detached from an open position and then attached over the top of the keyboard to be used as a protective cover.

Figure 41:
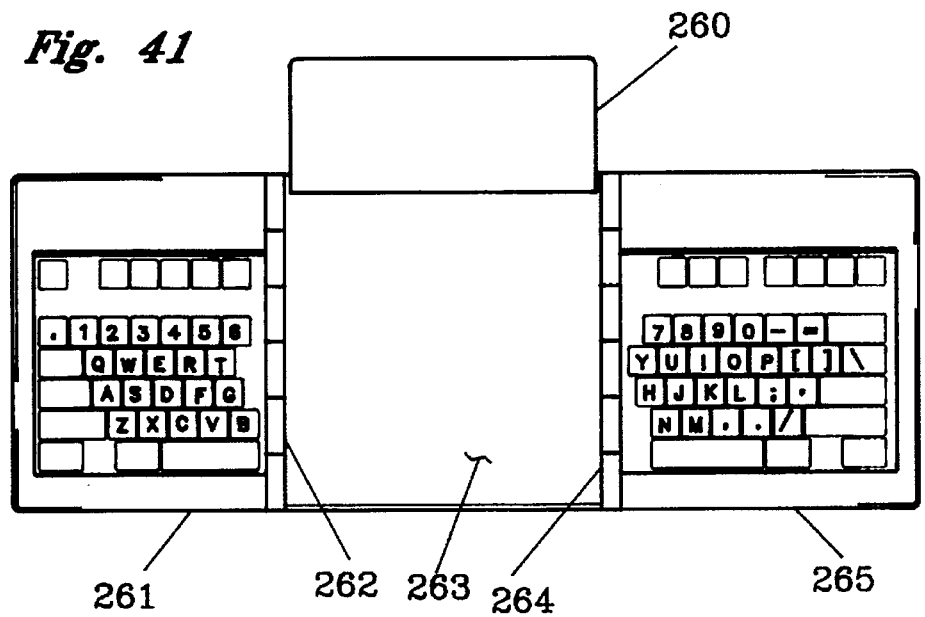
FIG. 41 is a top view of a keyboard showing the right and left sections of the keyboard hinged at the right and left sides of the material holder in accordance with the teachings of this invention.
Figure 42:
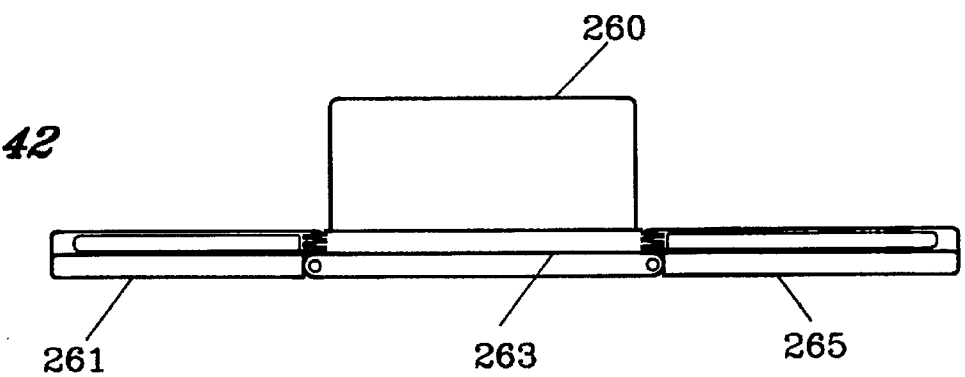
FIG. 42 is a front view of a keyboard showing the right and left sections of the keyboard hinged at the right and left sides of the material holder, positioned coplanar to the material holder in accordance with the teachings of this invention.
Figure 43:
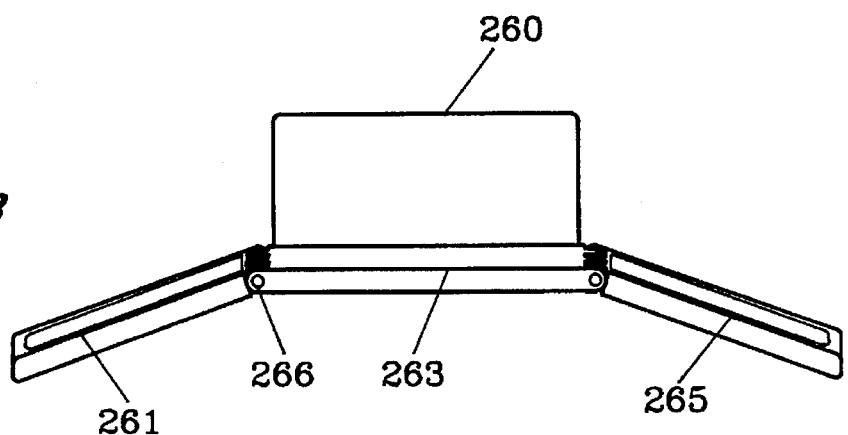
FIG. 43 is a front view of a keyboard showing the right and left sections of the keyboard hinged at the right and left sides of the material holder, positioned at an angle greater than horizontal to the material holder in accordance with the teachings of this invention.

FIGS. 41 through 43 show a stand alone keyboard that can be connected to computers for data entry where the sides of the keyboard can be angled to a position that is most comfortable for the user. FIG. 41 is a top view of the keyboard where the left side keyboard 261 and the right side keyboard 265 are hinged to the sides of activity area 263 with a material holder 260 on the rear edge of activity area 263. Material holder 260 is shown in the open position, in a closed position material holder 260 is either folded over the keyboard or stored with the keyboard. FIG. 42 is a front view of the keyboard as shown in FIG. 41, showing left side keyboard 261 and right side keyboard 265 in an horizontal position. FIG. 43 shows a front view of the keyboard in FIG. 41 with the left side keyboard 261 and the right side keyboard 265 pivoted at pivot 266 to an angle greater than horizontal. To maintain the angled position of each side of the keyboard while in use, detents as shown in FIG. 28 or the frictional type detents can be used.

Figure 44:
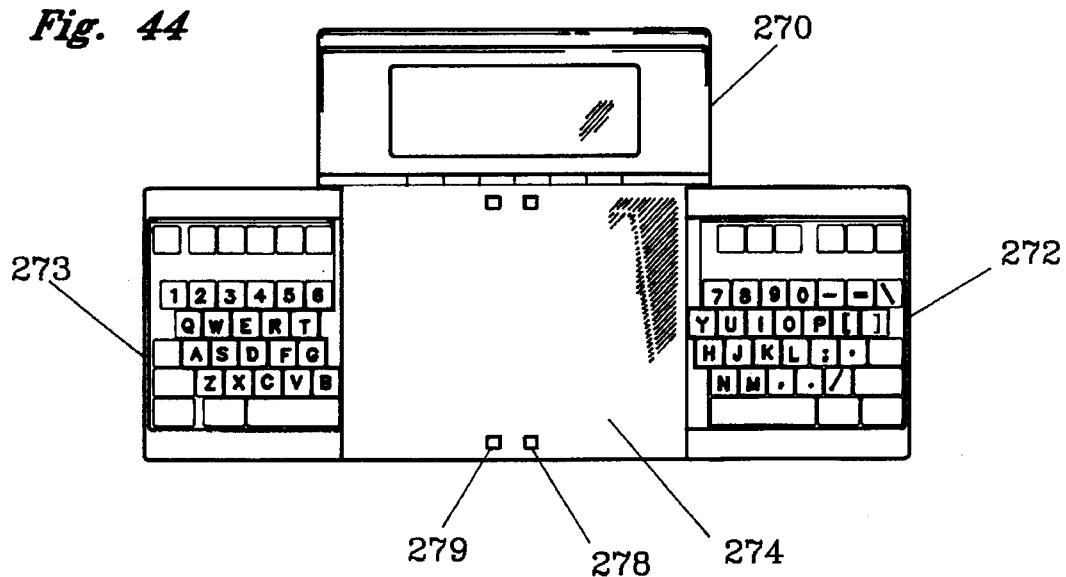
FIG. 44 is a top view of a computer showing the right and left keyboards can be detached to be positioned either separable, as shown, or together in one contiguous keyboard with a display in a foldable rear cover in accordance with the teachings of this invention.
Figure 45:
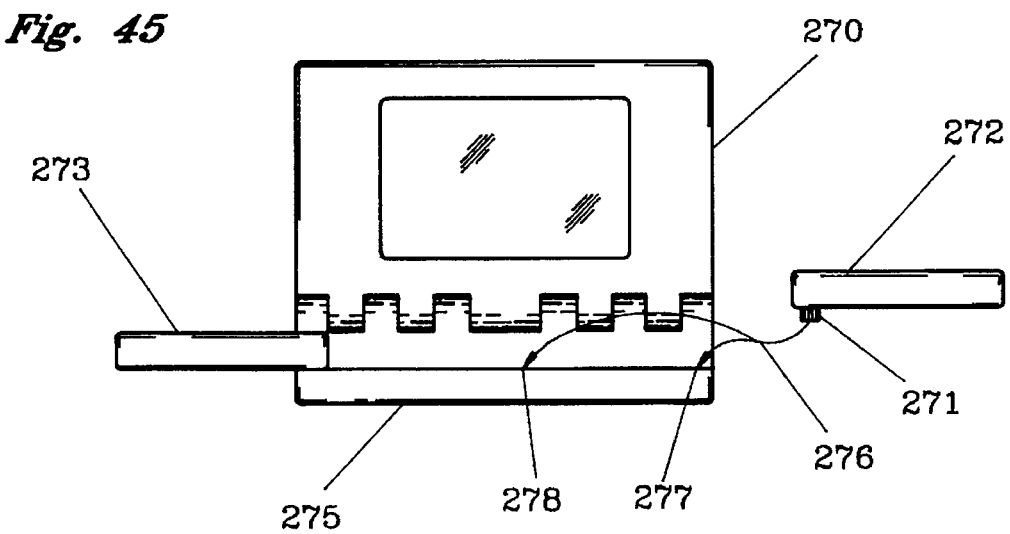
FIG. 45 is a front view of the computer of FIG. 44 showing the right and left keyboards can be detached to be positioned either separable, as shown, or together in one contiguous keyboard with a display in a foldable rear cover in accordance with the teachings of this invention.
Figure 46:
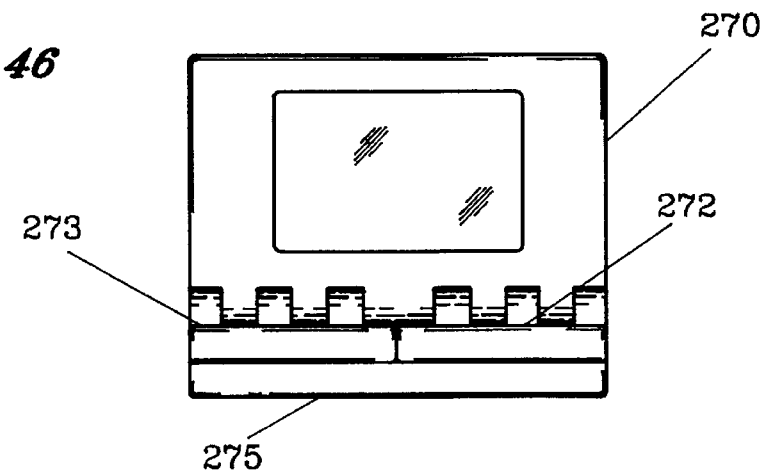
FIG. 46 is a front view of the computer of FIG. 44 showing the right and left keyboards can be detached to be positioned either separable or together, as shown, in one contiguous keyboard with a display in a foldable rear cover in accordance with the teachings of this invention.

FIGS. 44 through 46 show a laptop or notebook computer with a display 270 in a rear hinged cover and left and right keyboards that detach, and can be plugged in to different locations. Having the advantage to detach the keyboards and then plug them into different locations means there are no flexing wires every time the keyboards are opened and closed. This will add to the MTBF of the keyboard. FIG. 44 shows the top view of computer 275 with left keyboard side 273 plugged into a left position and right keyboard side plugged into a right position. Left receptacle 279 and right receptacle 278 are positioned to be used when the left and right side keyboards are in a closed position. It is to be understood that the number and position of the receptacles could be at any interval. FIG. 45 shows a front view with right side keyboard 272 detached. Connector 271 follows line 276 to an open keyboard connection point in receptacle 277 or to a closed keyboard connection point in receptacle 278. Both sides of the keyboard can be operated in any of these positions. Receptacles 279, 277 and 278 can be configured in various locking forms to detent and secure the keyboards in their operating positions. FIG. 46 shows a front view with both keyboards in a closed position. Display 270 can be positioned over the keyboards to a closed position.

Those skilled in the art can appreciate that these plug-in locations can also be at different points, e.g. the ends and or sides of the keyboard sides. The plug-in on the ends of the keyboard sides would produce a flat top surface of the computer and both keyboard sides.

Figure 47:
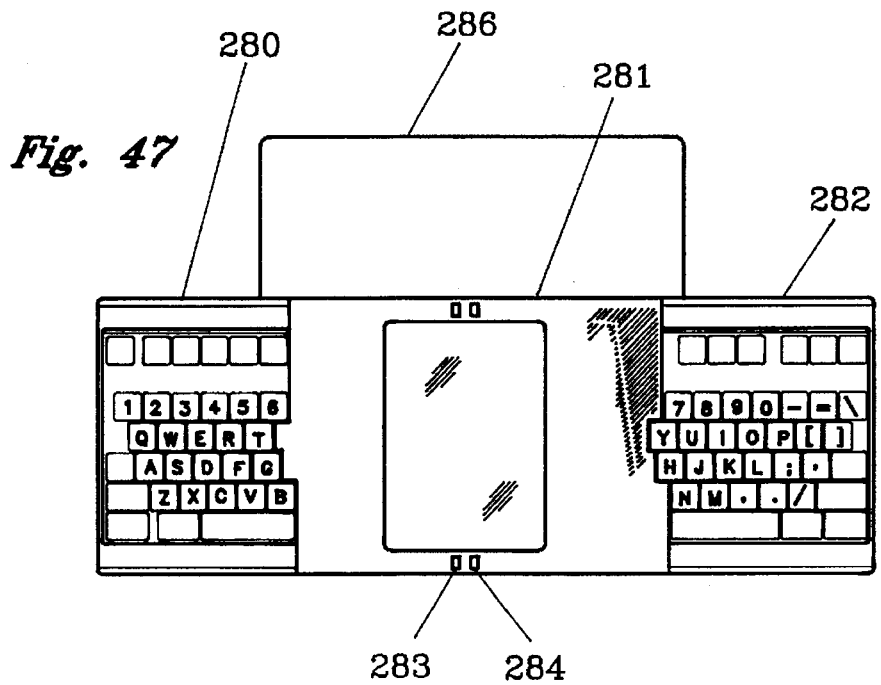
FIG. 47 is a top view of a computer showing the right and left keyboards can be detached to be positioned either separable, as shown, or together in one contiguous keyboard with a display between the keyboards and a material holder in the open position in accordance with the teachings of this invention.
Figure 48:
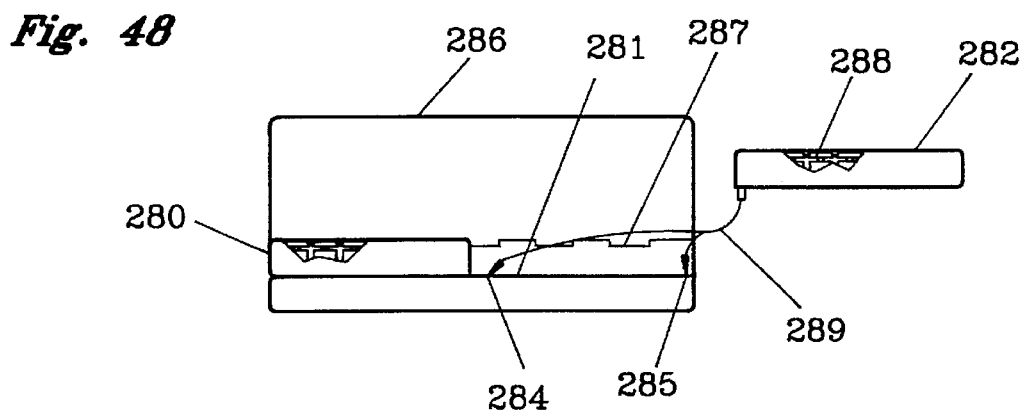
FIG. 48 is a front view of the computer of FIG. 47 showing the right and left keyboards, with keys on the top surface, being detached to be positioned either separable or together in one contiguous keyboard with a display between the keyboards and a material holder in the open position in accordance with the teachings of this invention.
Figure 49:
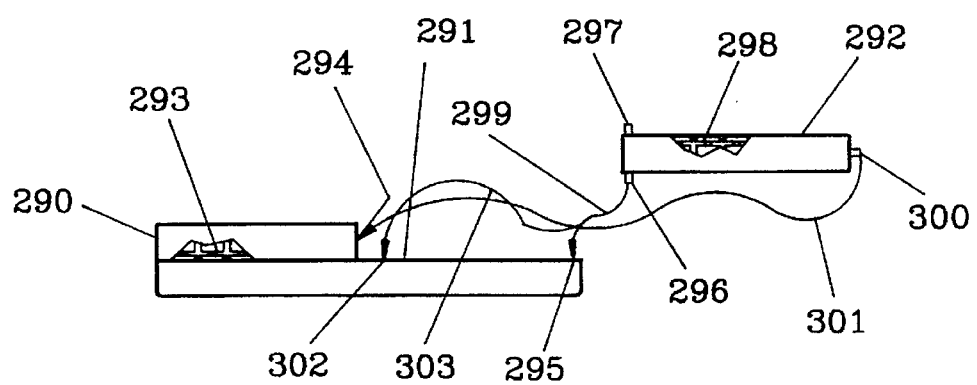
FIG. 49 is a front view of the computer of FIG. 47 showing the right and left keyboards, with keys on the bottom surface, being detached to be positioned either separable or together in one contiguous keyboard with a display between the keyboards in accordance with the teachings of this invention.

FIGS. 47 through 49 show a laptop or notebook computer with a display between the left and right keyboards that detach, and can be plugged into different locations. Also the advantage to detach the keyboards and then plug them into different locations means there are no flexing wires every time the keyboards are opened and closed. FIG. 47 is a top view of the computer with left keyboard 280 and right keyboard 282 in a separated position. Left receptacle 283 and right receptacle 284 are positioned to be used when the left and right side keyboards are in a closed position. It is to be understood that the number and position of the receptacles could be at any interval. Material holder 286 can be folded over the keyboards to protect the key switches or to hold reference material when in the open position. FIG. 48 is a front view of the computer with the left keyboard 280 in a closed position and right keyboard 282 in a detached position. Line 289 shows the path in which the keyboard can travel to either be plugged into receptacle 285 for an open position or into receptacle 284 for a closed position. Receptacles 284 and 285 can be configured in various locking forms to detent and secure the keyboards in their operating positions. Keys 288, in cutaway view, are shown on the top surface of right keyboard 282, in this location the material holder 286 can fold at hinge 287 to protect these keys when the computer is being transported. FIG. 49 shows the keys 293, in cutaway view, on the bottom side of left keyboard 290 when the keyboard is stored for transport. Right keyboard 292 has keys 298, in cutaway view, on the top surface in an operable position. Line 299 shows a path that right keyboard 292 would move through to plug detent connector 296 into receptacle 295 for an open position so the display in the top surface of computer 291 can be seen by the user. Line 303 is the path the keyboard would follow to plug detent connector 296 into receptacle 302. It can be appreciated that if the left keyboard was plugged into a similar position, the two keyboards would be a contiguous set of keys. In this configuration the display could not be seen, but the computer can be plugged into a host computer to be used as an input device like a standard keyboard to down or up load data to the host. To store the keyboard for transport the line 301 shows the path right keyboard 292 would follow so detent connector 300 would plug into detent receptacle 294 and detent connector 297 would plug into detent receptacle 295. In the stored position keys 298 would be on the bottom surface like keys 293 on left keyboard 290. Detent connectors 300, 296 and 297 are retractable when not in use. It is to be appreciated that the left keyboard 290 could follow a similar path to be stored for transport.

The invention as described in the preferred embodiment has been described with only a left side and a right side keyboard. It is obvious to those skilled in the art that: different groups of keys forming a keyboard could be used; only one side of the keyboard could be fitted; or, a pointing device used on a side in conjunction with keys and with keys on the other side of the keyboard.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set being housed in a left housing;

a right hand set of alpha keys for entering said second plurality of alpha characters, said right hand set being housed in a right housing;

a flat planar surface forming a top surface of a structure separating said left hand set of alpha keys and said right hand set of alpha keys, said structure spanning substantially from front to rear of said keyboard;

said left and right housings forming left and right keyboards, respectively;

a pivot disposed on left and right sides of said structure separating said left hand and said right hand set of alpha keys, said pivot connecting said left and right housings to maintain alignment between said left and right housings and allowing said left and right housing to be positioned at angles below or above an horizontal plane formed by said planar surface; and a detent mechanism which interacts with said structure and at least one of said left and right housings for restraining movement of said at least one of said left and right housings, said detent mechanism at least restraining movement when said left and right sets of alpha keys are in said angles below or above said horizontal plane.

2. A keyboard as claimed in claim 1, further including a reference material holder disposed on said structure mounted from a fulcrum with an axis parallel to a longitudinal axis of said keyboard, said reference material holder moves in an arc which is perpendicular to said longitudinal axis of said keyboard from said fulcrum between a closed position near said flat planar surface to an open position.

3. A keyboard as claimed in claim 1, further comprising means for generating, and means for transmitting and receiving data by radio frequency signals responsive to said keyboard data entry.

4. A keyboard locking mechanism which allows a keyboard to be locked into at least one open orientation with respect to a housing of a computer processor, comprising:

a keyboard having a first side and a second side with keys positioned on at least said first side of said keyboard, said keyboard having first and second ends which span a distance between said first side and said second side of said keyboard, said second end of said keyboard having a housing engaging surface;

a housing for a computer processor, said housing having a keyboard engaging surface against which said first side of said keyboard is positioned when said keyboard is in a closed orientation, said housing having keyboard end engaging surfaces against which said second end of said keyboard is positioned when said keyboard is oriented in at least one open orientation;

a link having first and second ends, said link connecting said keyboard to said housing by first and second pivot members positioned in said first and second ends of said link, wherein said first pivot member connects said link to said keyboard, and said second pivot member connects said link to said housing;

first and second slots in said housing, said second pivot member connecting said link and said housing being positioned to slide within said first slot in said housing;

a locking pawl connected to said second pivot member, said locking pawl being positioned to slide within said second slot in said housing, said second slot having at least one locking detent region; and a spring connected to said second pivot member connecting said link and said housing, said spring biasing said locking pawl into said locking detent region of said second slot when said keyboard is oriented in at least one of said open orientations and drawing said housing engaging surface of said second end of said keyboard against said keyboard end engaging surface of said housing.

5. A keyboard as claimed in claim 4, wherein said first slot is divergent to said keyboard engaging surface; and said keyboard first side is locked in said closed orientation by said spring biasing.

6. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set being housed in a left housing;

a right hand set of alpha keys for entering said second plurality of alpha characters, said right hand set being housed in a right housed in a right housing;

said left and right hand sets of alpha keys being moveable on interconnecting front and rear support members towards a closed position where said left and right hand sets of alpha keys are one contiguous set of alpha keys and in an opposing direction where said left and right hand sets of alpha keys can be in a separated position exposing said support members;

said left and right housings forming said left and right keyboards; and a reference material holder mounted below said left and right hand sets of alpha keys that moves from an open position to a closed position, said reference material holder open position being vertical to a longitudinal axis of said keyboard, said reference material holder closed position being nested in at least one of said left and right housings enabling said reference material holder to remain with said keyboard in said closed position, said keyboard is operable in said closed position and said keyboard is operable in said separated position with said reference material holder in both said open position and said closed position.

7. A keyboard as claimed in claim 6, wherein said reference material holder is rotatably mounted to said left housing and is nested in said right housing when said keyboard is in said closed position.

8. A keyboard as claimed in claim 6, wherein said reference material holder is rotatably mounted to said right housing and is nested in said left housing when said keyboard is in said closed position.

9. A keyboard as claimed in claim 6, wherein said reference material holder is detachably mounted in said keyboard for storing, and attached to said keyboard in said reference material holder open position.

10. A keyboard as claimed in claim 6, further comprising means for generating, and means for transmitting and receiving data by radio frequency signals responsive to said keyboard data entry.

11. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard;

said left and right housings forming left and right keyboards, respectively;

said structure connecting said left and right housings to maintain alignment between said left and right housings;

a computer processor housed in said structure between said left and right keyboards, wherein said left housing is detachably disposed on the left side of said structure and said right housing is detachably disposed on the right side of said structure, and wherein said left and right housings have attachment points for a closed position that is over said flat surface and for at least one open position that exposes at least part of said flat surface;

a detent mechanism which interacts with said structure and at least one of said left and right housings for restraining movement of said at least one of said left and right housings, said detent mechanism at least restraining movement when said left and right sets of alpha keys are in said closed position; and a display rotatably disposed on said rear of said structure on an axis parallel to a longitudinal axis of said keyboard, said display moves in an arc which is perpendicular to said longitudinal axis of said keyboard from a closed position over said left and right housings when said left and right housings are in said closed position to an open position where said display is at least perpendicular to said structure.

12. A keyboard as claimed in claim 11, further comprising a second display disposed on said structure.

13. A keyboard as claimed in claim 11, further comprising means for generating, and means for transmitting and receiving data by radio frequency signals responsive to said keyboard data entry.

14. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard;

said left and right housings forming left and right keyboards, respectively;

said structure connecting said left and right housings to maintain alignment between said left and right housings;

a computer processor housed in said structure between said left and right keyboards;

a display disposed on said flat surface, wherein said left housing is detachably disposed on the left side of said structure and said right housing is detachably disposed on the right side of said structure, and wherein said left and right housings have attachment points for a closed position that is over said flat surface and said display, and for at least one open position that exposes at least part of said flat surface; and a detent mechanism which interacts with said structure and at least one of said left and right housings for restraining movement of said at least one of said left and right housings, said detent mechanism at least restraining movement when said left and right sets of alpha keys are in said closed position.

15. A keyboard as claimed in claim 14, wherein said left and right hand set of alpha keys are exposed and operable when said left and right housings are in said closed position and said open position.

16. A keyboard as claimed in claim 14, further including a reference material holder rotatably disposed at the rear of said structure and moveable from a closed position over said left and right housings to an open position at least vertical to said structure.

17. A keyboard as claimed in claim 14, wherein said left and right hand set of alpha keys are exposed and operable when said left and right housings are in said closed position and said open position; and said left and right housings can be rotated to a stored position, wherein said left and right housings are attached to said structure with said left and right hand set of alpha keys facing said structure.

18. A keyboard as claimed in claim 14, further comprising means for generating, and means for transmitting and receiving data by radio frequency signals responsive to said keyboard data entry.

\* \* \* \* \*